PERIPHERAL CONTROL WORD PROGRAM START

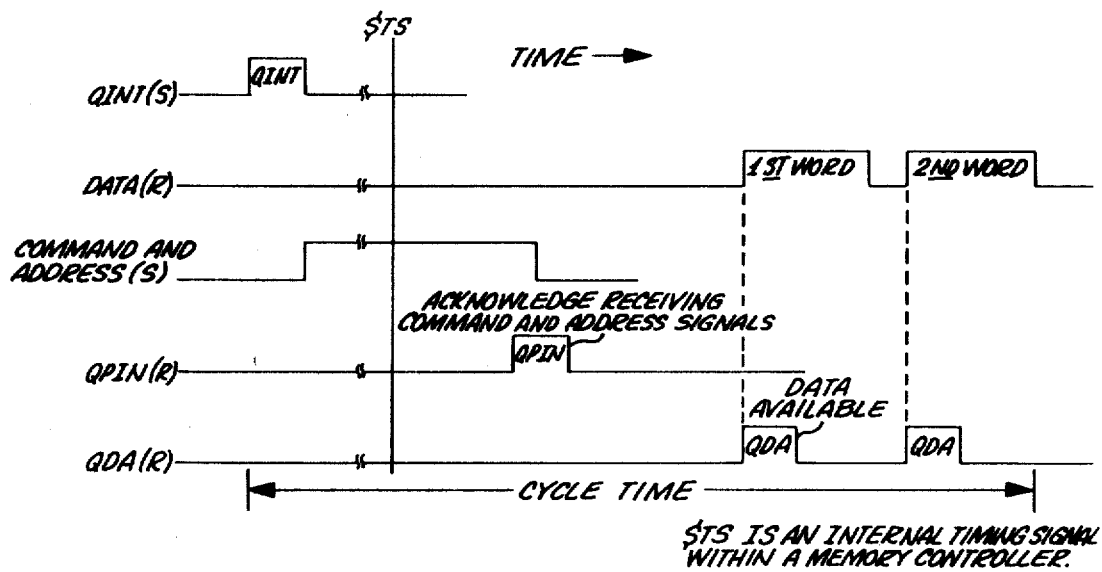
RRS, DP
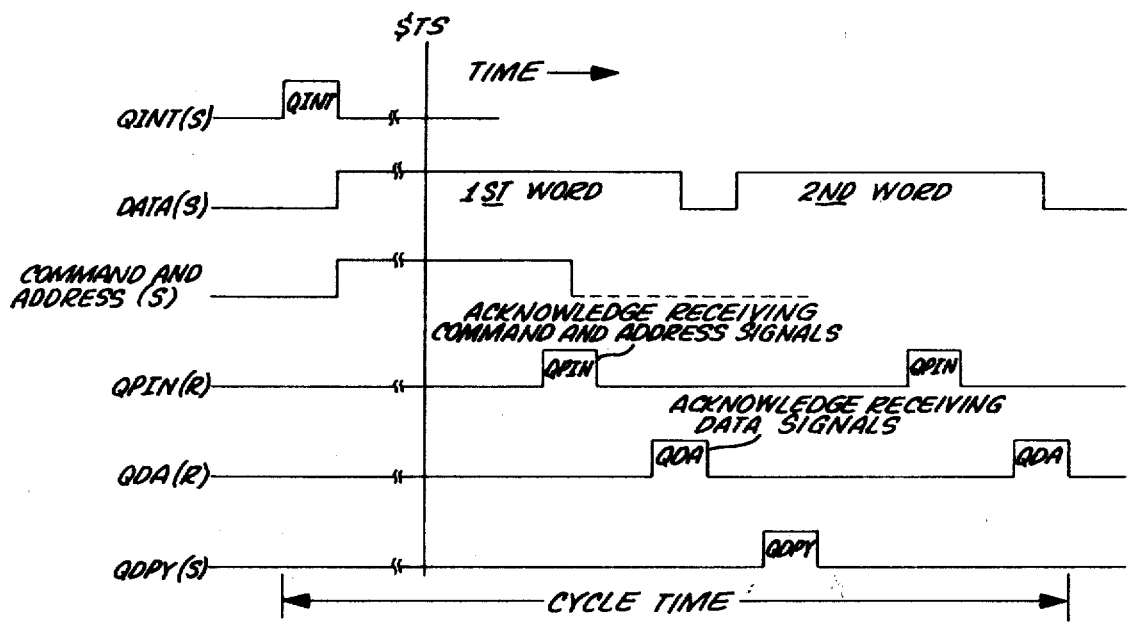
CWR, DP
*MAIN MEMORY TIMING SIGNAL WAVEFORMS*
*Fig. 7*

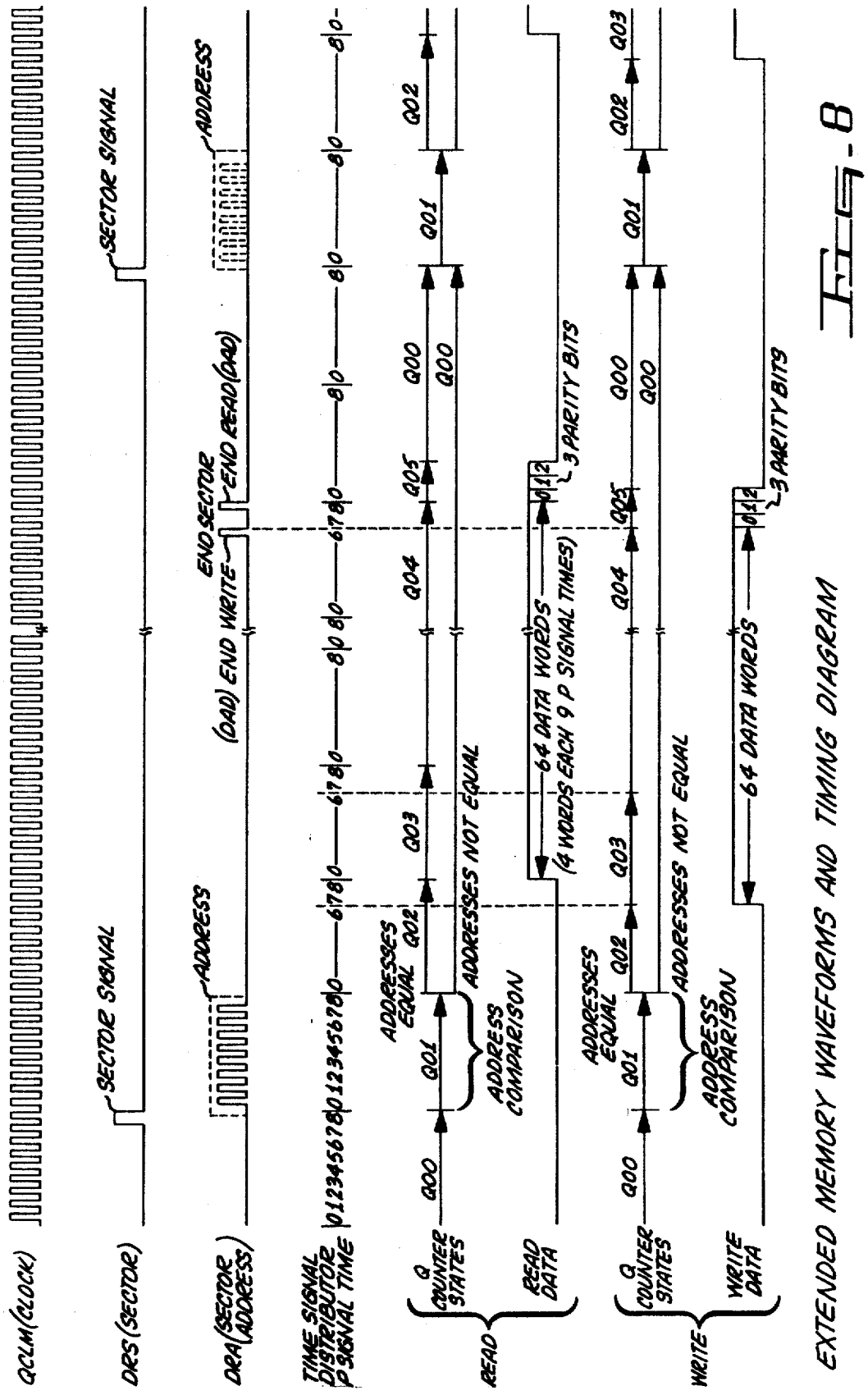
FIG. 8 EXTENDED MEMORY WAVEFORMS AND TIMING DIAGRAM

F REGISTER CONTENTS = 00000 (DIS)

| Q COUNTER STATE | J COUNTER STATE | CONTROL SIGNALS | ACTION |
|---|---|---|---|
| Q00 | J00 | QCN1·N18 | TRANSFER SIGNALS ON N BUS LINES 0-17 TO R REGISTER |
| Q00 | J05 | | PRESET J COUNTER = J05<br>GENERATE AND APPLY QINT SIGNAL TO MEMORY CONTROLLER<br>ADVANCE TO DATA CONTROL WORD RETRIEVAL CYCLE OF OPERATION |

RETRIEVE DATA CONTROL WORD CYCLE

| Q COUNTER STATE | J COUNTER STATE | CONTROL SIGNALS | ACTION |
|---|---|---|---|
| Q00 | J05 | J05 | TRANSFER RRS, DP (10001) SIGNALS TO COMMAND LINES<br>TRANSFER ADDER OUTPUT SIGNALS TO ADDRESS LINES 0-17<br>PRESET Q COUNTER TO Q00 STATE |
| Q00 | J05 | $\overline{LAS}$·QDA | TRANSFER SIGNALS ON N BUS LINES 0-17 TO S REGISTER 0-17<br>TRANSFER SIGNALS ON N BUS LINES 18-35 TO A REGISTER 0-17<br>SET LAS FLIP-FLOP TO BINARY 1 STATE |
| Q00 | J05 | LAS·QDA | TRANSFER SIGNALS ON N BUS LINES 0-17 TO R REGISTER 0-17<br>TRANSFER SIGNALS ON N BUS LINES 18-22 TO F REGISTER 0-4<br>RESET LAS FLIP-FLOP TO BINARY 0 STATE<br>GENERATE AND APPLY QINT SIGNAL TO MEMORY CONTROLLER |
| *Q00 | J03 | | PRESET J COUNTER = J03 |
| Q00 | J03 | | PREFORM HOUSEKEEPING OPERATION REQUIRING MEMORY ACCESS |
| Q00 | J03 | QDA | ADVANCE TO READ, WRITE OR DISCONNECT DATA CONTROL WORD CONTROL CYCLE |

\* F REGISTER CONTENTS NOW EQUAL ONE OF THE FOLLOWING BINARY DIGIT COMBINATIONS:

00000 (DIS)
11000 (READ)
11010 (WRITE)

Fig-9

United States Patent Office 3,525,080
Patented Aug. 18, 1970

3,525,080
DATA STORAGE CONTROL APPARATUS FOR A MULTIPROGRAMMED DATA PROCESSING SYSTEM
John F. Couleur, Dallas, Tex., and Edward L. Glaser, South Euclid, Ohio, assignors to Massachusetts Institute of Technology, Cambridge, Mass., a corporation of Massachusetts, and General Electric Company, New York, N.Y., a corporation of New York
Filed Feb. 27, 1968, Ser. No. 708,633
Int. Cl. G06f 15/16
U.S. Cl. 340—172.5
10 Claims

ABSTRACT OF THE DISCLOSURE

A multiprogrammed data processing system wherein separate control apparatus automatically controls the continuous transfer of information between working and auxiliary stores and wherein the control apparatus further automatically controls the type of information transfer being provided, thereby implementing the flow of data at the speed required by the system.

BACKGROUND OF THE INVENTION

This invention relates to data processing systems and more particularly to apparatus for controlling the transfer of information among the plural stores of a data processing system.

A data processing system including a computer for alternately executing a series of programs which are completely or partially located in a quick-access working store is said to be multiprogrammed. One form of multiprogrammed data processing system comprises at least one computer, a plurality of small capacity quick-access working stores, a relatively large capacity auxiliary store and a plurality of peripheral control units each coupled to at least one peripheral device. In such a multiprogrammed data processing system, the series of programs are executed by the computer as a result of switching between a plurality of programs. The program switching is controlled by an operating system, which is a collection of programs that are executive or supervisory in nature and provide overall coordination and control of the total data processing system. The plurality of programs also include subject programs which are application oriented programs to perform various data processing jobs providing results required by users. In multiprogrammed data processing systems required to execute a large number of programs, the quick-access working store capacity is too costly to be large enough to contain all of the operating system programs, subject programs, data to be processed, and data which is the result of processing. Consequently, only the programs and data most frequently used or currently in process are normally located in working store and the remaining programs and data are located in a relatively large capacity slow-access auxiliary store. As programs and data stored in auxiliary store are required to be executed or processed by the computer, the information must be transferred to the working store at a speed compatible with the data processing capabilities of the computer.

It is necessary to maintain a continuous supply of programs or parts of programs and data for the working store if the operating system is to be able to have a plurality of different subject programs in process simultaneously. For operating systems to use the equipment complement of the entire data processing system most efficiently, operating systems must call for the right mix of programs for movement to working store. The operating system must also call for movement of processed data to auxiliary store. The operating system schedules the running of all programs by maintaining in a list, the order in which programs are to be run and providing for a calling sequence for initiating transfer of information between working and auxiilary stores when needed. Frequently the calling sequence initiates a series of transfers requiring frequent and repeated changes in storage functions, such as storage and retrieval operations of both auxiliary and working stores, to provide for continuous data processing operations.

Generally, control of information movement between working and auxiliary stores in the system described comprises expeditiously transferring data to be processed, data which is the result of processing, and the programs or parts of programs providing the required data processing functions between the working and auxiliary stores and controlling each of the working and auxiliary stores to provide efficient storage and retrieval of the information being transferred. Such control may be effected by one of the peripheral control units. Auxiliary stores normally function as one of a plurality of peripheral devices being controlled by a peripheral control unit.

All data processing operations are performed on operand words under control of instruction or control words of programs. An operand word represents a unit of information to be processed or information which is the result of processing. An instruction word, hereafter referred to as an instruction, designates a particular operation for the computer to perform. A control word designates a particular type of peripheral device operation or data transfer function for a peripheral control unit to control. Each control word comprises portions called "address fields" which identify specific locations in working and auxiliary stores that contain instruction, control or operand words.

The peripheral control unit gains access to working store locations by means of control words which are stored in working store and transferred to the control unit in response to a computer executing a particular instruction of an operating system calling sequence. Once the control unit receives a control word it performs autonomously to retrieve and execute a succession of additional control words to provide for data transfer operations. The computer is now free to continue with its high speed execution of subject programs.

Prior art peripheral control units provide for transfer of information between stores by controlling the execution of a succession of control words termed data control words. One form of prior art peripheral control unit employs data control words comprising an address field which identifies the specific location in a store that contains the next data control word in the succession.

The form of prior art peripheral control unit which utilizes the previously described address field during retrieval of each next data control word in the succession, performs the same transfer function throughout the succession of data control words. At the time of initiation of the succession, the computer directs the peripheral control unit as to what transfer function must be executed. Associated with each transfer function are specific storage operations, such as storage or retrieval of information in the stores involved in the information transfer. Accordingly, the peripheral control unit directs the stores, involved in the transfer, as to what type of storage operation must be provided. Only by interrupting the computer and having it initiate another succession of data control words to perform a different transfer function, can the transfer function performed by the peripheral control unit be altered. Each such transfer function change requires a delay in information transfer due to terminating the execution of a succession of data control words and transferring control back to the computer before a new transfer function can be initiated.

Therefore, it is an object of this invention to provide storage control apparatus for enabling improved communication between the stores of a multiprogrammed data porcessing system.

Another object of this invention is to provide storage control apparatus for enabling improved communication between the working and auxiliary stores of a multiprogrammed data processing system.

It is another object of this invention to provide control apparatus for enabling most efficient use of a data storage system by effecting timely program information transfer between working and auxiliary stores.

It is still another object of this invention to provide control apparatus for enabling improved information transfer function control between working and auxiliary stores.

SUMMARY OF THE INVENTION

The foregoing objects are achieved, according to one embodiment of the instant invention, by providing in a multiprogrammed data processing system, storage control apparatus for automatically responding to information provided in a data control word, which directs the transfer of information between specific locations in two different data stores, to retrieve a succession of data control words and to control the type of information transfer to be effected for each data control word.

The system of the instant invention includes at least one computer, at least one peripheral control unit, a large capacity auxiliary store, and a plurality of working stores. Each computer is an automatic data processing equipment unit which after it has been given an initial instruction is capable of operating on a series of instructions to generate a desired result.

Each peripheral control unit is essentially an automatic data processing equipment unit, which after it has been given an initial data control word is capable of operating on a succession of data control words to provide for control of a specific data input-output operation. The peripheral control unit is capable of requesting a data control word from working store and after controlling its execution, requesting the next data control word from working store. A peripheral control unit of the system is coupled to the plurality of working stores and the auxiliary store to provide for controllable transmission of information between one of the plurality of working stores and the auxiliary store.

Each data cotnrol word includes address fields providing a representation of the following addresses: (1) the working store address of the information to be transferred, (2) the auxiliary store address of the information to be transferred and (3) the working store address of the next data control word to be retrieved by the peripheral control unit. Each data control word includes, in addition to the address fields, a function portion. The function portion specifies such transfer functions as the direction of transfer, other transfer functions, or nontransfer functions. Associated with each direction of transfer function is a corresponding storage operation, such as for example, the retrieval and storage operations of the working and auxiliary stores. The peripheral control unit responds to the function portion of each data control word in a succession of data control words to generate the required communication to each store. Accordingly, each data control word may specify a storage operation change. Thus, the peripheral control unit of the instant invention frees the computer of the time consuming burden of controlling changes in auxiliary and working store storage operations during the transfer of data between working and auxiliary stores.

Accordingly, the peripheral control unit of the instant invention, responds to data control word information to automatically retrieve a succession of data control words from the working store and to control changing the type of storage operations of both auxiliary and working stores, thereby implementing automatic change in type of information transfer functions without intervention of a data processor to provide for the transfer of program information between working and auxiliary stores at the high data transfer rate required by a multiprogrammed data processing system.

BRIEF DESCRIPTION OF THE DRAWING

This invention will be described with reference to the accompanying drawings wherein:

FIG. 7 illustrates waveforms of control signals transmitted between the memory controller and extended memory controller;

FIG. 8 illustrates waveforms and timing diagrams of the various signals supplied by the extended memory and the extended memory controller of FIG. 3;

FIG. 9 is a timing diagram useful in explaining the operation of the system during retrieval of data control words.

DESCRIPTION OF THE PREFERRED EMBODIMENT

Figure 1:
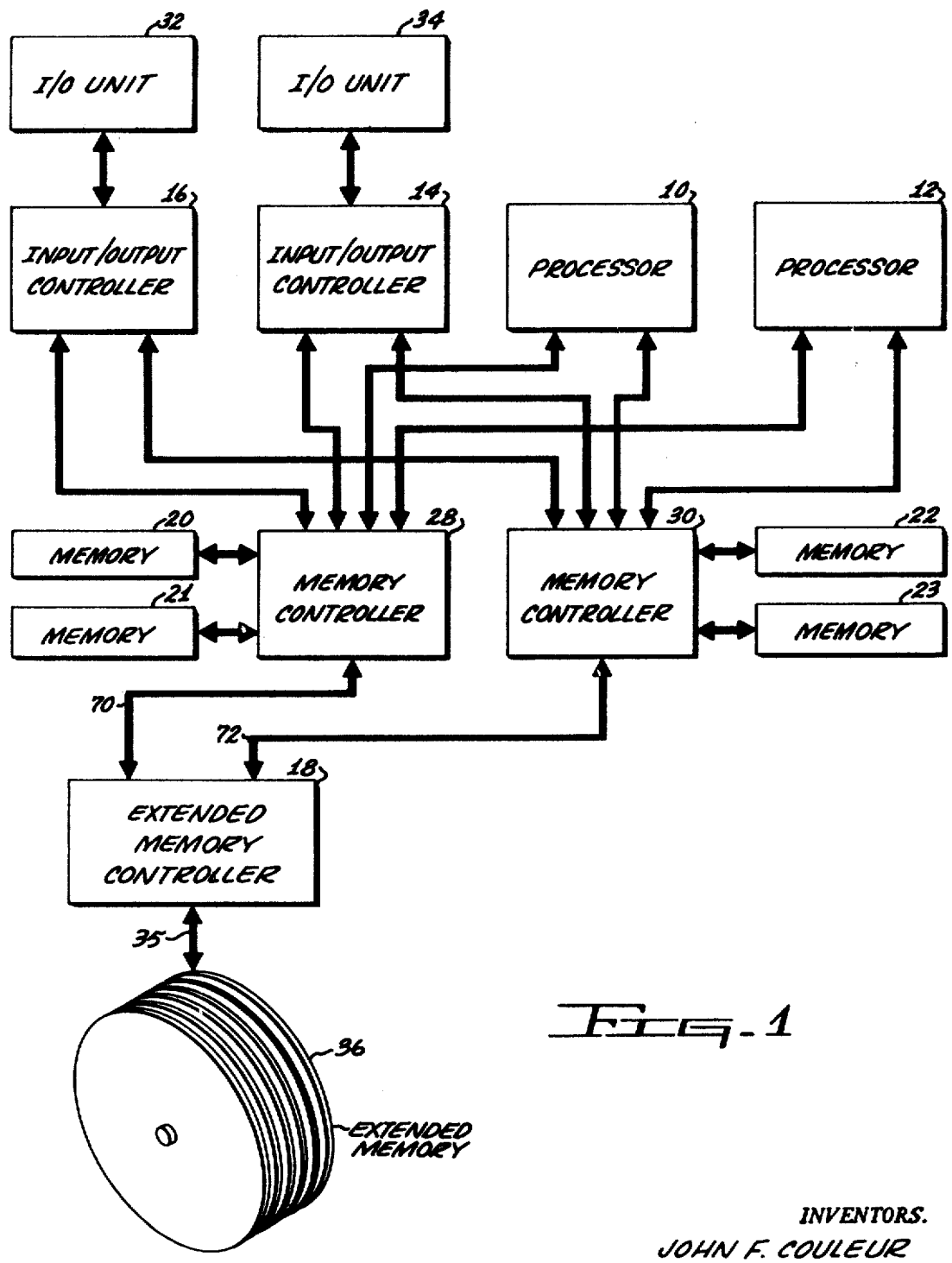
FIG. 1 is a block diagram of a multiprogrammed data processing system embodying the instant invention.

The data processing system of FIG. 1 is adapted to process large amounts of information very rapidly by performing many different processing operations simultaneously under control of a plurality of programs completely or partially stored in a working store. Lines interconnecting the various components illustrated in FIG. 1 symbolically represent cables providing a plurality of conductors providing paths of data and control communication.

A working store, to be referred to hereinafter as a main memory, may comprise by way of example memories 20–23. The main memory provides for storage of information which is available for immediate processing by the data processing system. An auxiliary store which may be, for example, extended memory 36 is provided as an extension of the main memory. Extended memory 36 provides storage for overflow information which cannot be contained within main memory. Memories 20–23 are quick-access low capacity memories, which may be for example, conventional random access magnetic core stores.

Extended memory 36, may be for example, a relatively slow-access high capacity conventional rotating magnetic disc or drum store.

Computers, which may be for example processors 10 and 12, are provided for performing the actual processing of information. Peripheral control units, which may be for example, input/output controllers 14 and 16 and extended memory controller 18 are provided for controlling the transfer of information between main memory and peripheral data handling units which may be I/O units 32 and 34 and extended memory 36 respectively. I/O units 32 and 34 represent external devices connected to input/output controllers 16 and 14 respectively to provide communication with the system of FIG. 1, under control of input/output controllers 14 and 16. The I/O units introduce new information into the data processing system or initiate particular data processing operations. For example, I/O units 32 and 34 may be such peripheral devices as magnetic tape handlers, punched card readers or communication terminal devices.

All information to be processed is either retrieved or stored in information units, known as data words, in memories 20–23 by processors 10 and 12. Data words may also be retrieved from or stored in memories 20–23 by input/output controllers 14 and 16 and extended memory controller 18.

Data words are units of information utilized by the system and comprise instruction and control words of programs and operand words representing information to be processed or information which is the result of processing. The processors and controllers respond to a series of instructions or control words, known as a program, to perform a particular data processing or transfer operation on operand words. The data word employed in the illustrated embodiment is composed of 36 binary digits.

Processors 10 and 12 and controllers 14, 16 and 18 are connected to memory controllers 28 and 30. Memory controllers 28 and 30 are each also connected to a respective pair of memories 20–23.

Memory controllers 28 and 30 receive and schedule all communications between processors 10 and 12 and controllers 14, 16 and 18 and memories 20–23. The purpose of the memory controllers is to enable communication between any one of memories 20–23 and any one of the processors or controllers. Each memory controller is connected to all processors and controllers of the system thereby making it possible for each processor or controller to have access to different ones of memories 20–23. The memory controller also makes it possible for each connected processor or controller to control different ones of memories 20–23.

Extended memory controller 18 functions as an automatic information transfer apparatus providing communication between memory controllers 28 and 30 and extended memory 36 for transferring information between memories 20–23 and extended memory 36 at a high data transfer rate. Extended memory controller 18 also functions as a controller for memory controllers 28 and 30 and extended memory 36 to control the storage functions of retrieval and storage of information in one of memories 20–23 and extended memory 36.

Each of memories 20-23 and 36 is an addressable memory, wherein a storage location is explicitly and uniquely specified by means of an address. Only a single data word may be stored in an addressable location of memories 20–23, whereas a predetermined number of data words may be stored in an addressable location of memory 36. A data word is retrieved from or inserted into a storage location of the addressable memory only after such memory is supplied with the address of the location.

Extended memory controller 18 operates autonomously to control the execution of a succession of data control words, following initiation of operation, while the remainder of the system is available for other operations. The successions of data control words are parts of programs performed under control of the operating system.

For example, operation of extended memory controller 18 is initiated by the operating system and proceeds to automatically control both one of memories 20–23 and extended memory 36 to provide different storage operations and transfer functions to transfer data between a number of consecutive locations in memories 20–23 and a location in extended memory 36. Processors 10 and 12 and input/output controllers 14 and 16 each may continue independently executing different programs or controlling the execution of parts of programs respectively, during multiprogrammed data processing system operation.

The present invention is directed to improving the operation of the multiprogrammed data processing system of FIG. 1 in transferring information between memories 20–23 and extended memory 36. Accordingly, the description of the mode of operation of the invention will be primarily directed to the operation of the system in the transferring of information between memories 20–23 and extended memory 36.

There will now be provided a summary description of the operation, of a portion of the system of FIG. 1, when the operating system specifies that communication is to be made between one of memories 20–23 and extended memory controller 18. One instance when such communication is required is when all or a portion of a subject program, which is not in memories 20–23, must be executed. Extended memory 36 contains the subject programs which are not currently in use but are required for early execution. These programs are requested by the operating system. The data words comprising a subject program in extended memory 36 must be moved into available space in memories 20–23 before it may be accessed by a processor or controller for execution. One of processors 10 or 12, upon executing a particular type of instruction, termed a "connect" instruction, of the operating system programs, requests information not currently in memories 20–23. When the processor executes the particular type of instruction, a signal is generated and applied to one of memory controllers 28 or 30 to initiate a storage retriveal operation for retrieving a particular type of control word, termed a peripheral control word and referred to hereinfter as "PCW," from one of memories 20–23 and delivering the particular type of control word to extended memory controller 18.

The control words are stored in memories 20–23 by the operating system programs. The operating system programs also provide the "connect" instruction to one of processors 10 or 12 which execute the instruction by providing control signals to one of memory controllers 28 or 30. The addressed memory controller responds to the control signals to provide for retrieval of the "PCW" from one of memories 20–23 and to deliver the "PCW" to extended memory controller 18. Extended memory controller 18 responds to the "PCW" to initiate an information transfer between one of memories 20–23 and extended memory 36. If the "PCW" delivered to extended memory controller 18, upon execution of the aforementioned "connect" instruction, contains a "start" retrieve data control word pair operation portion, controller 18 must start an operation to control information transfer functions between extended memory 36 and one of memories 20–23. The information transfer function to be provided is determined by retrieving the contents of two successive locations in one of memories 20–23, utilizing an address supplied by the PCW. The data words in these two locations are the first of a succession of pairs of data control words hereinafter designated as "DCW's."

Extended memory controller 18 retrieves the first pair of DCW's as a result of providing a request for access to one of memories 20–23 by applying an access request signal to one of memory controllers 28 or 30. Assuming that controller 18 is given access to memory 20 by memory controller 28, controller 18 then sends address and control signals specifying a read type of operation by memory 20 through memory controller 28. Memory 20 responds to the control signals to perform a read operation for reading a pair of DCW's out of the memory locations specified by the address signals and transfers the pair to memory controller 28. Memory controller 28 then transmits the pair of DCW's, one word at a time to extended memory controller 18, where they are stored. Controller 18 responds to the DCW's to provide for the subsequent type of information transfer function and control of the particular type of storage operation of both main and extended memories as specified by a portion of the retrieved DCW's.

Each pair of DCW's contain a function portion which determines the type of transfer function to be controlled by controller 18. Controller 18 responds to the function portion of the DCW to control the type of information transfer such as the direction of information transfer between memory 20 and extended memory 36. Controller 18 also responds to the function portion to transmit control signals to memories 20 and 36 to control the type of storage operation of each memory, such as retrieval or storage, which are to be referred to hereinafter as read or write operations respectively. Successive pairs of DCW's may therefore specify a change in type of operation to be performed.

If the DCW pair specifies that information is to be transferred from one of memories 20–23 to extended memory 36, the extended memory controller 18 sends an access request, address signals and control signals specifying a read function to one of memory controllers 28 or 30 and a control signal specifying a write operation accompanied by address signals to extended memory 36. Memory controller 28 or 30 then initiates a read operation in one of memories 20–23 for retrieving four data words from four consecutively addressed locations commencing with the location specified by the main memory address in the DCW pair stored in controller 18. These four data words are transferred one word at a time, to extended memory controller 18. Controller 18 then transfers the four data words to extended memory 36 which writes the four words into the location specified by the address supplied by the DCW pair. While the data words are being written in extended memory 36, controller 18 initiates another retrieval operation to retrieve another four data words from four main memory locations adjacent the locations from which the preceding four words were retrieved. This sequence of operations is repeated until a predetermined number of words, such as 64 data words, have been transferred from 64 consecutively addressed locations in memories 20–23 and stored in a 64 word capacity location of extended memory 36. The writing operation is automatically terminated when the 64 words have been written into the addressed location of extended memory 36.

At the completion of the writing operation, extended memory controller 18 sends an access request, address signals representing the address where the next DCW pair is located in one of memories 20–23 as denoted by the current DCW pair and control signals specifying a retrieval storage function to one of memory controllers 28 or 30. Memory controller 28 or 30 responds by controlling one of memories 20–23 for reading and transferring the next pair of DCW's to extended memory controller 18. Controller 18 then controls the information transfer between memories and storage operations of both the main and extended memories as specified by the new pair of DCW's.

A read operation specified by a DCW pair is executed by extended memory controller 18 in a manner similar to the preceding description for a write operation except that 64 data words are retrieved from extended memory 36 and transmitted for storage in one of memories 20–23.

The operation of retrieving the next DCW pair is repeated at the completion of each operation specified by a DCW pair until a particular nontransfer function identified as a "disconnect" operation is specified by a PCW or DCW pair. Extended memory controller 18, upon receiving a PCW or DCW specifying a "disconnect" operation terminates transfer functions and storage operations and remains in an inactive state until another PCW is received which specifies a "start, retrieve data control word pair" operation.

The multiprogrammed system of FIG. 1 processes information represented by the binary code. With the binary code, each element of information is represented by a binary digit, sometimes termed a bit, each binary digit being either a one or a zero. The unit of information primarily employed in processing is termed the data word, and also sometimes termed a computer word. The data word in the system of FIG. 1 comprises 36 bits. Four types of data words are employed in this system: instruction words, operand words, and two types of control words.

The operand word is a data word on which an arithmetic or logical operation is performed by processors 10 or 12 or which is the result of a data processing operation performed by a processor. Thus, the operand word represents information which is to be processed and which is received from a memory by a processor, or information which is the result of processing and which is transmitted to a memory by a processor.

The instruction word is employed to direct a discrete step in the data processing operation being executed by a processor. The instruction word is received from a memory by a processor.

The two types of control words are designated as peripheral control words (PCW's) and data control words (DCW's). A PCW (FIG. 2) is composed of 36 binary digits of information. The first 18 bits of the PCW designated as bits 0–17 provide a binary number representing the address of the first location of two successive locations in one of memories 20–23 containing the first pair of a succession of data control words. Two bits designated as bits 18, 19 provide a code specifying the type of operation to be performed by the extended memory controller, and three bits 33–35 are utilized by the memory controller in steering the PCW to the extended memory controller. The PCW also has 13 spare bits.

If the PCW bits 18 and 19 are both binary 0's, an emergency disconnect operation is specified and the extended memory controller immediately halts any operation in process. The emergency disconnect operation is effective only when the extended memory controller is transferring information, which is referred to as the busy state. If bit 18 is a binary 0 and bit 19 is a binary 1, the extended memory controller performs a housekeeping operation, an understanding of which is not material to an understanding of the invention. If bit 18 is a binary 1, a "start retrieve data control word pair" operation for retrieving a DCW pair from one of memories 20–23 is specified.

A pair of DCW's, FIG. 2, designated as DCW1 and DCW2 hereinafter, are each composed of 36 binary coded bits of information. The first indicated 18 bits of DCW1, designated bits 0–17, provide an address in extended memory 36 hereinafter referred to as "extended memory address" and 18 bits designated 18–35 provide the beginning address of locations hereinafter referred to as "data address" in the memories 20–23 being adapted to store information which is to be transferred. DCW2 contains 36 bits, 18 bits designated 0–17 provide the main memory address of a location in one of memories 20–23 containing the DCW1 of the next DCW pair (the address of the location containing DCW1 is hereinafter referred to as the link address to the next DCW pair in a succession of DCW's). DCW1 also contains 5 bits designated 18–22 providing a function code to specify the type of operation to be performed by extended memory 36 during an information transfer or whether a current storage operation and associated transfer function in progress is to be terminated by a disconnect operation as shown in the following table.

| Code: | Type of operation |
|---|---|
| 00000 | Disconnect. |
| 11000 | Read. |
| 11010 | Write. |

One bit designated as bit 23 provides for control of an operation, an understanding of which is not material to an understanding of this invention. DCW2 also has 12 spare bits.

Figure 3:
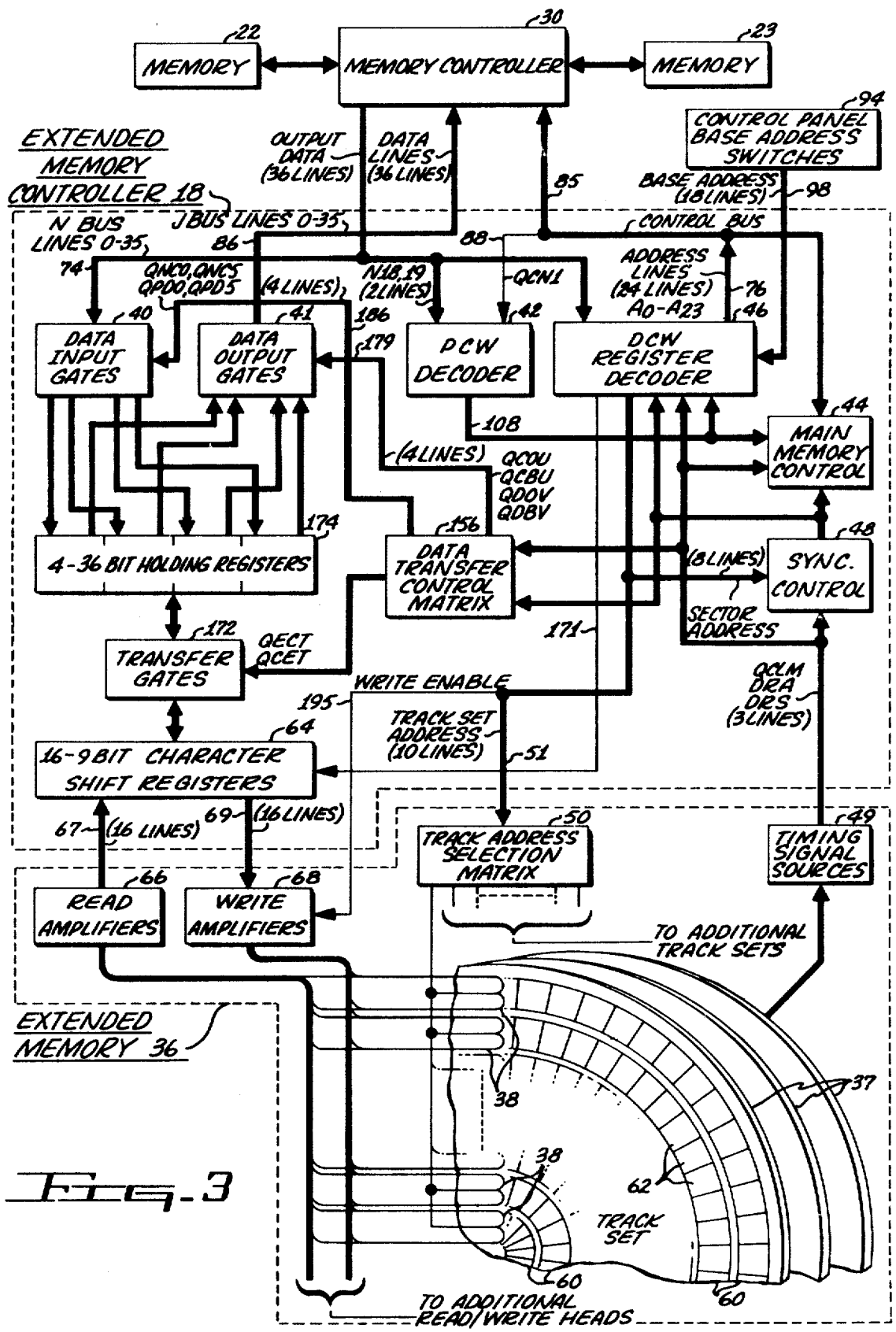
FIG. 3 is a block diagram illustrating, in detail, the instant invention.

A summary description of the operation of extended memory controller 18, FIG. 3 will now be provided. During its operation the extended memory controller is always in one of two phases, either the "retrieve data control word pair" cycle or the control cycle for controlling execution of a DCW pair. In the retrieve data control word cycle, the extended memory controller retrieves a DCW pair from two successive storage locations in one of working stores 20–23, transfers the function code portion of the DCW to a DCW register decoder 46 and senses the function to be controlled or determines the type of storage operation to be executed and the next cycle to be entered. Decoder 46 responds to the function code to generate a corresponding function signal. In the control cycle the extended memory controller responds to the function signal to provide for either terminating an operation in process or controlling a particular type of transfer function for receiving or transmitting data in a specified direction. The extended memory controller also responds to the function signal to generate storage control signals which are applied to one of memory controllers 28 or 30 and extended memory 36 to control the particular type of storage operations to be provided.

The particular type of operation is determined by one of three function signals which are presented at the output of decoder 46 namely DIS, RDY, or WRY corresponding to the previously described disconnect, read, and write operations respectively. These signals are provided in accordance with the binary configuration of the states of five flip-flops of a register designated as the F register in decoder 42.

During initialization of operation, extended memory controller 18 receives a PCW from one of memories 20–23 as a result of a memory controller responding to a processor executing a connect instruction. Output data lines identified as N bus 74 provides 36 lines, designated as (0–35), are connected between memory controller 28 and extended memory controller 18 to provide an information transfer path from controller 30 to controller 18. N bus 74 supplies bits 18 and 19 of the peripheral control word to a PCW decoder 42 and the address portion of the PCW (bits 0–17) for storage in a register of DCW register decoder 46. Decoder 42 also receives a signal designated as QCN1 on a line 88, to be described hereinafter, from memory controller 30 to enable decoding bits 18 and 19 to determine what operation is to be performed by extended memory controller 18.

Assuming that decoded bits 18 and 19 specify that a "start," retrieve data control word pair operation is to be performed, decoder 42 provides a control signal resulting from decoding bits 18 and 19 to a main memory control 44. Control 44 then applies a request for access, a command code specifying a main memory retrieval operation and the address of a pair of DCW's to memory controller 30 on lines within cable 85 which is designated as the control bus interconnecting controllers 30 and 18. Memory controller 30 responds by retrieving and transmitting a pair of DCW's applied one word at a time to N bus 74 for transfer into decoder 46 in response to control signals from main memory control 44.

DCW register decoder 46 decodes the function portion of the DCW to provide control signals for controlling one of memories 22 or 23 and extended memory 36 to effect a specified information transfer between memories. Control signals from decoder 46 are applied to main memory control 44, synchronization control 48, write amplifiers 68, track address selection matrix 50, and data transfer control matrix 156. Main memory control 44 responds to a RDY or WRY function signal to provide a command code and other control signals to be described hereinafter to memory controller 30 on control bus 85 and control signals to decoder 46 to control applying the address of information to be transferred to control bus 85 and subsequently to memory controller 30. The control signals supplied to synchronization control 48 comprise an extended memory sector address which is compared with sector addresses applied from extended memory 36 until comparison is achieved indicating that the addressed location is available for access. The control signals applied to track selection matrix 50 comprise a track set address for activating 16 read/write heads simultaneously.

While address comparison is being performed by synchronization control 48, main memory control 44 has provided signals which in the case of a write operation have provided for the retrieval of the transfer of four 36 bit words from 4 consecutive locations of one of memories 22 or 23 into four 36 bit holding registers 174. Since N bus 74 provides only 36 lines for transfer of one 36 bit word at a time, 4 sets of 36 gates within data input gates 40 are enabled selectively by 4 signals from data transfer control matrix 156 to enter 36 bits successively into a first, second, third and fourth 36 bit holding register. In the case of a read operation, no main memory information transfer is performed until after address comparison. For a write operation, upon achieving sector address comparison by extended memory control 48, the four 36 bit word holding register 174 contents are transferred in parallel through transfer gates 172, in response to a control signal applied to transfer gates 172 from data transfer control matrix 156 into sixteen 9 bit character shift registers 64.

For a read or write operation, following address comparison, main memory control 44 provides shift signals to each of the sixteen 9 bit character shift registers, beginning at the proper time, to permit shifting information bits serially from each shift register to write amplifiers 68 or from read amplifiers 66 into each shift register at the bit time reading or writing rate of extended memory 36. After nine shift signals 16–9 bit character shift registers 64 are either filled with 16 characters which have been read or are empty and need refilling with 16 new characters to write during the next nine shift signals.

During a read operation, main memory control 44 provides for parallel transfer of sixteen 9 bit character shift registers 64 to four 36 bit word holding registers 174 and subsequent application to memory controller 30 along with command, address and timing signals to provide for a storage operation of fours words in one of memories 22 or 23 following every nine shift signals. During every nine shift signals provided while performing a write operation, four new 36 bit words are retrieved from memory 22 or 23, transferred in parallel into four 36 bit word holding registers 174 and then into sixteen 9 bit character shift registers 64 before applying the first of the next eight shift signals during a write operation. Main memory control 44 provides for automatically incrementing the address applied to memory controller 30 such that words are stored in or retrieved from a block of 64 main memory locations whose addresses are consecutive.

The control of a read or write operation continues until an end sector signal is received by the extended memory controller from extended memory 36. When the end sector signal is received, main memory control 44 discontinues the supply of shift signals to sixteen 9 bit character shift registers and provides control signals for initiating a retrieval of the next DCW pair from the main memory utilizing the main memory address of the next DCW supplied by the DCW portion designated as the link address and previously stored in a register of DCW register decoder 46.

A detailed description will now be given of the structure of the major components and signals as shown in FIGS. 4 through 9.

Peripheral and data control word addressing in the storage system of the described embodiment is relative addressing, which is well-known in the art. Relative addressing is the employment of memory addresses which are not the identity of exact memory locations, but are only relative to a reference location. The reference location is determined by the operating system when the program or data control words are loaded into main memory. Relative addressing is a technique required in multiprogramming for optimizing the location of data words in memories 20–23. In this manner the data control words can be located in any one of the plurality of working stores coupled to the memory controller with each of the relative addresses being directed to that specific memory through the use of base addresses which will be described hereinafter.

The following conventions in terminology and notation are to be followed in the drawings and the following description. It will be noted in the drawings that there are wide connecting lines and narrow connecting lines. A wide connecting line indicates a number of conductors or a cable of conductors, whereas a narrow connecting line indicates a single conductor.

Extended memory controller logic blocks are made up of conventional storage and shift registers, counters, flip-flops, OR-gates, AND-gates, inverters, comparators, pulse distributors, decoders, encoders and control matrices which are well-known in the art and which operate in a normal manner. The extended memory controller logic blocks will be described in detail hereinafter.

The term "control matrix" as used in the following description comprises a set of gates provided to route logic level signals, hereinafter referred to as binary 1 signals or binary 0 signals throughout the extended memory controller. For example, the control matrix consists of OR and AND-gates, certain of which will be enabled when a given output line from a decoder is present as an input together with a timing signal to provide outputs for sequencing operations. The control matrix must therefore control the distribution of signals in a timed sequence to correct points throughout the machine in response to the receiving of certain time related signals and certain decoded control signals.

In the description hereinafter the term "read" is used to specify an operation of retrieving information from extended memory 36 and transferring the information to one of memories 20–23 for storage. The term "write" is used to specify an operation of retrieving information from one of memories 20–23 and transferring the information to extended memory 36 for storage.

Memory controllers 28 and 30 may be of a type disclosed in copending patent application by David L. Bahrs, John F. Couleur, William A. Shelly and Richard L. Ruth entitled "Intercommunicating Multiple Data Processing System," assigned to the same assignee as this patent application and bearing the Ser. No. 555,491 and filed on June 6, 1966.

Memory controller 28 with associated memories 20 and 21 as shown in FIG. 1 is identical in construction and operation to memory controller 30 which is to be described with reference to FIG. 3. FIG. 3 illustrates the signal conductors which couple together the major components of memory controller 30 and extended memory 36. Operation of memory controller 30 is described in the pending application previously cited. Memory controller 30, in the following description, provides access to memories 22 and 23 by extended memory controller 18.

Memory 22 will be described with reference to FIG. 4.

Memories 20–23 may be identical. Memory 22 comprises a memory storage unit 52, a buffer register for temporarily holding words retrieved from and to be stored in the memory storage elements and denoted as input/output register 54, a register for identifying storage locations and denoted as address register 56, read/write control circuits 58 and gates (not shown) as required. Memory storage unit 52 is adapted to store a plurality of operand words, instruction words and control words in a corresponding plurality of memory storage locations, each such location storing one word. Each memory storage location is designated by an address.

One form of memory storage unit suitable for employment with memory 22 is the coincidence current magnetic core type of random access memory well-known in the art. Memory 22 is of the well-known double precision type wherein two words in two locations with consecutive addresses are addressed simultaneously with one even numbered address and the two words are transferred to memory controller 30 successively one word at a time during a double precision memory cycle time. For example, the address of an even numbered location will automatically address the even numbered location and the next higher numbered odd location, such as locations 100 and 101. During a double precision memory cycle time, two words may be stored or retrieved in any two memory locations with consecutive numbered addresses, where the first location has an even numbered address.

Storage unit 52 may have various capacities for storage. One storage unit which may, for example, be employed with the instant invention has capacity for storing approximately 32,000 data words, each word comprised of 36 binary digits. Each binary digit of a word is stored in a corresponding magnetic core. The location of a particular word is identified by a number stored in address register 56 and a particular word is retrieved from or entered into memory storage unit 52 at the location identified by the contents of address register 56. Memory storage unit 52 stores information words including instruction words, operand words, and data control words at random address locations or in groups of consecutively addressed locations. As the term is used herein, random access pertains to the process of obtaining data from or placing data into memory storage unit 52 wherein the time required for such access is independent of the location of the information most recently obtained or placed in storage.

Input/output register 54 receives words from memory controller 30 which are intended for storage in the storage unit. Words are entered into the input/output register 54 from either storage unit 52 or the memory controller. Words retrieved from storage unit 52 are applied to memory controller 30 and also applied to storage unit 52 for restoration. An address is entered into the address register from memory controller 30. Read/write control circuits 58 provide output signals to control the retrieval of data words from and storage of data words into storage unit 52. The required signals for controlling storage unit 52, input/output register 54, address register 56, and read/write control circuits 58 originate from memory controller 30.

Figure 4:
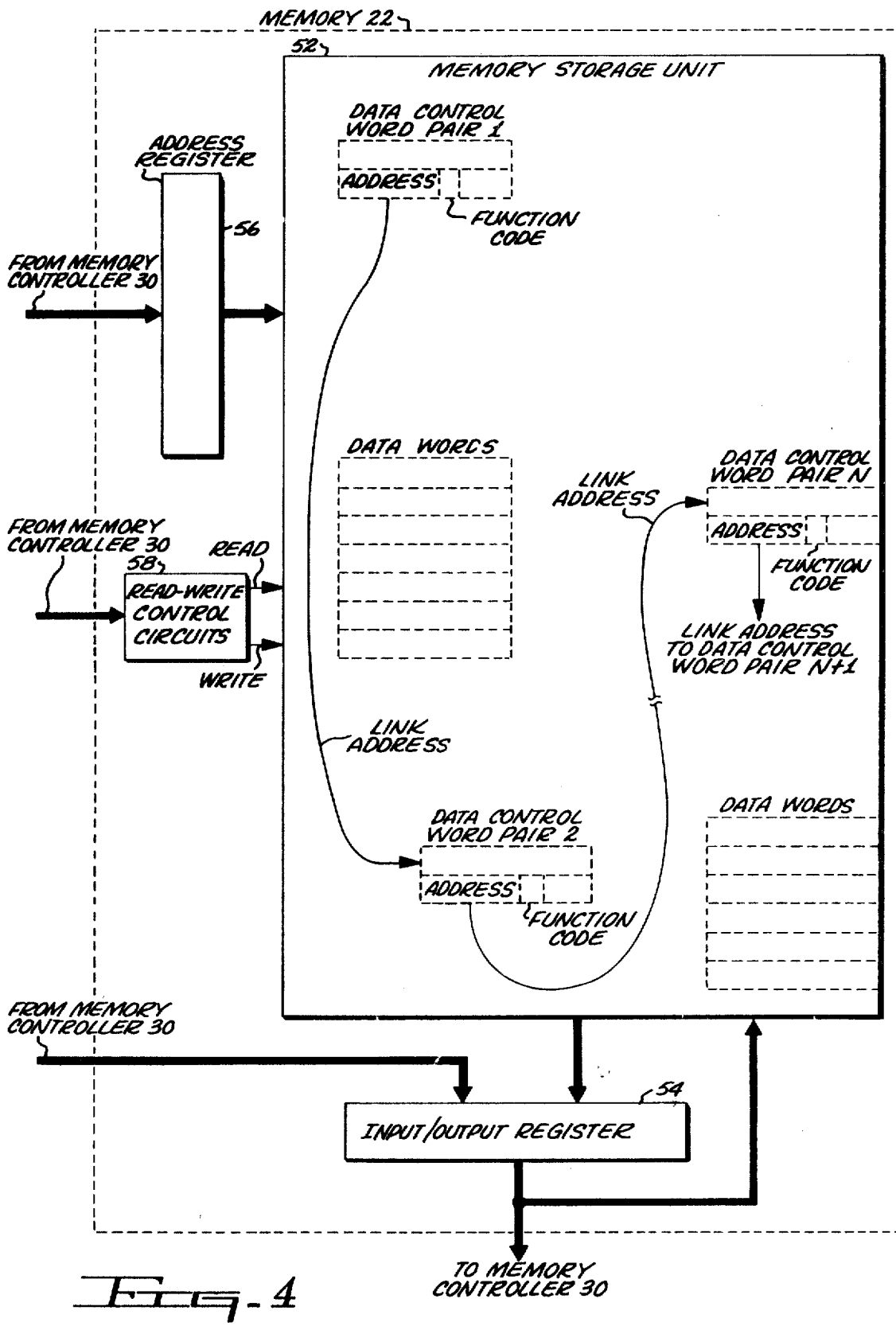
FIG. 4 is a block diagram of a memory of FIG. 3, and includes a storage map illustrating a succession of data control words.

FIG. 4 represents a memory map for memory storage unit 52 illustrating the location of randomly located DCW pairs with each DCW pair providing a link address to the locations containing the next DCW pair. Each DCW pair arranged for execution in a specific order by the operating system is located in any consecutively addressed random location pair. Since each DCW pair contains the address of the next DCW pair, a succession of randomly located DCW pairs can be linked together. The particular memory storage unit 52 employed with the present invention has a double precision memory cycle time of 1 μsec. during which time two words may be stored or retrieved. The data control word pairs are stored at any two memory locations with consecutive addresses where the first location has an even numbered address while other program and operand information words are stored in groups of locations whose addresses are consecutive. In the illustrated embodiment of FIG. 3, words are transferred from extended memory 36 in blocks of 64 words to be stored in 64 main memory locations whose addresses are consecutive. Words transferred in the opposite direction are retrieved from 64 main memory locations, whose addresses are consecutive, for transfer to extended memory 36.

Control of memory controller 30 and extended memory 36 by extended memory controller 18 requires certain distinct communication signals. The cables providing communication and data transfer paths between extended memory controller 18 and memory controller 30 are illustrated in FIG. 1 by interconnecting lines 70 and 72 respectively. Interconnecting lines 70 and 72 each symbolically represent cables, thus N bus 74, U bus 86 and control bus 85 of FIG. 3 are represented by line 70 in FIG. 1.

Figure 5:
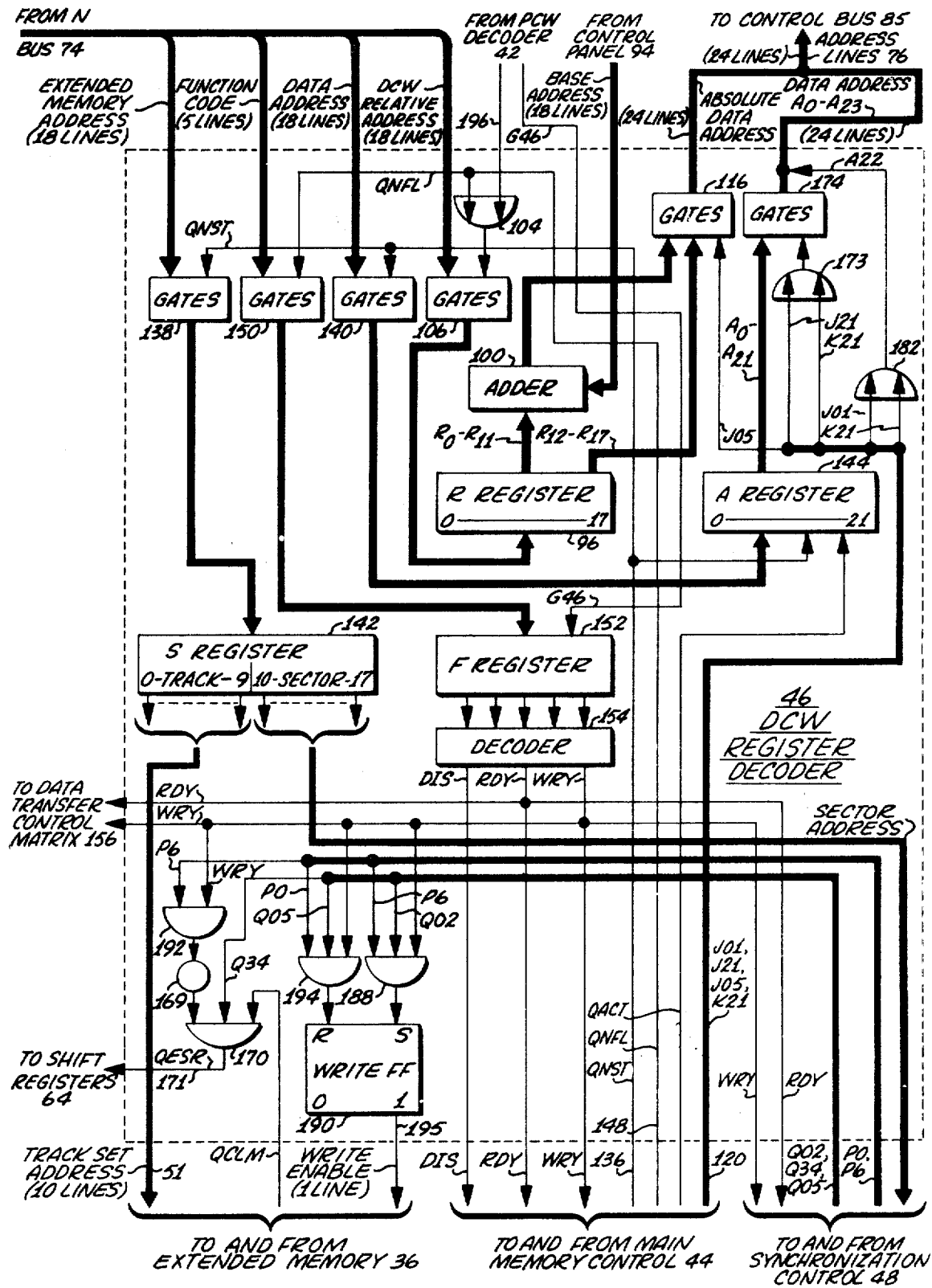
FIG. 5 is a block diagram of the DCW register decoder of FIG. 3.
Figure 6:
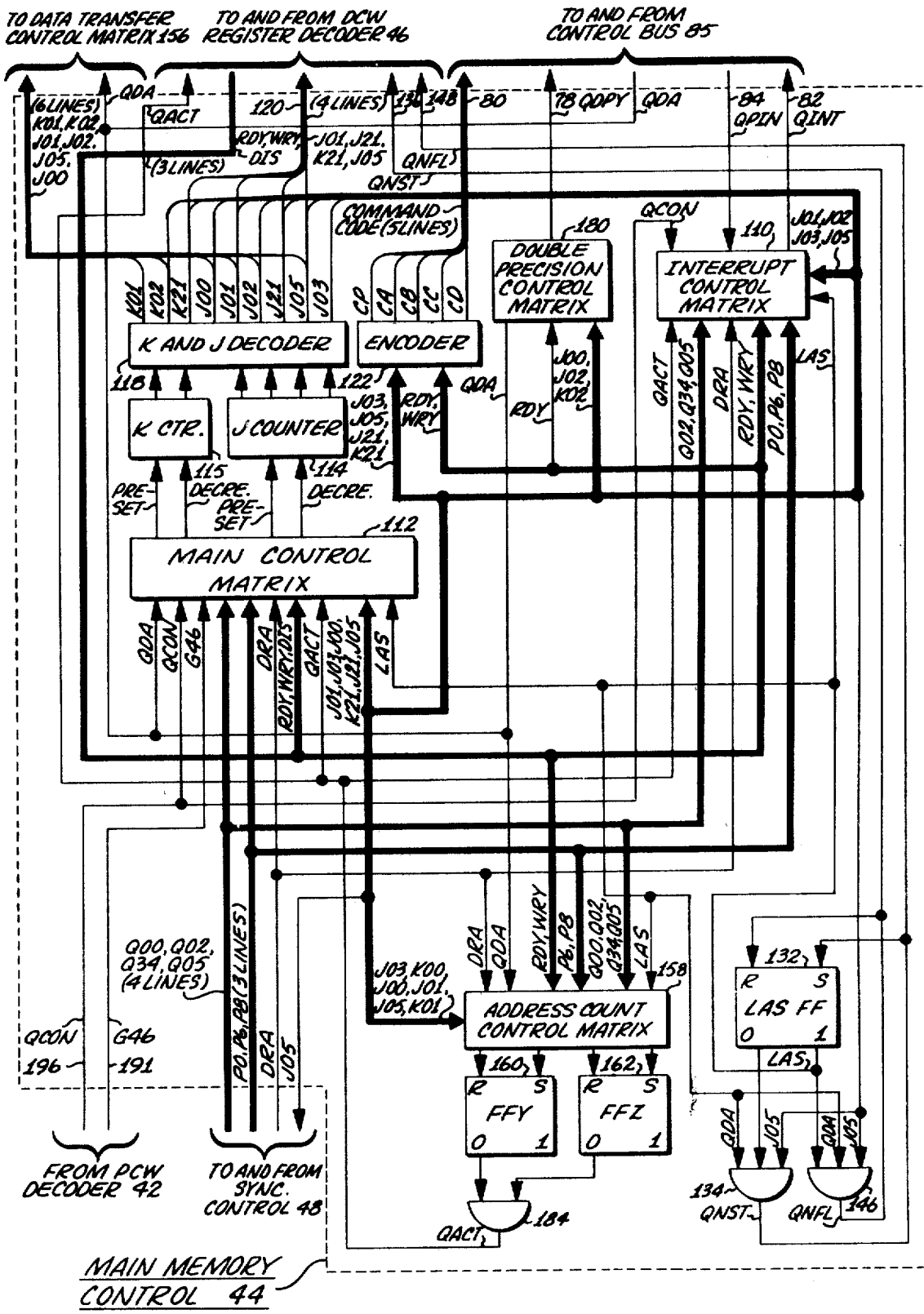
FIG. 6 is a block diagram of the main memory control of FIG. 3.

Information, address and control signals which are transmitted between the memory controller 30 and extended memory controller 18 are as designated in FIGS. 3, 5 and 6. In the illustrated embodiment the interconnecting conductors providing communication paths between extended memory controller 18 and memory controller 30 are all contained within N bus 74, U bus 86 and control bus 85 as illustrated in FIG. 3. All information is transferred as 36 bit words on 36 data lines of U bus 74 and 36 data lines of N bus 86 as shown.

The N and U buses communicate selectively through data input gates 40 and data output gates 41, four 36 bit holding registers 174, and other logic blocks of extended memory controller 18. The U bus provides data for transfer to memory controller 30 from the four 36 bit holding registers. The N bus receives the output of the memory controller and applies these output signals directly to PCW decoder 42 (bits 18 and 19) and selectively into the four 36 bit holding registers 174 and selectively into registers of DCW register decoder 46.

The N and U buses are each connected to data input gates 40 and data output gates 41 respectively. Gates 40 are comprised of a plurality of gates for selectively controlling the transfer of 36 bit words, one word at a time into different ones of four 36 bit holding registers 174. Gates 41 are comprised of a plurality of gates for selectively controlling the transfer of 36 bit words, one word at a time out of different ones of four 36 bit holding registers 174. Data input gates 40 transfer one word therethrough in response to each of the four designated signals on lines 186 while data output gates 41 respond to each of the four designated signals on lines 179. FIGS. 5 and 6 illustrate in detail the logic blocks of DCW register decoder 46 and main memory control 44. In these figures the control signals which are transmitted and received through control bus 85 are identified. The N bus lines are also selectively connected to the A, F, R and S registers of DCW register decoder 46 through gates 140, 150, 106 and 138 respectively, in response to signals from main memory control 44.

Control bus 85 provides for receiving and transmitting all control signals, other than information signals between memory controller 30 and extended memory controller 18. Control signals transmited to memory controller 30 are 24 address signals applied to control bus 85 on 24 lines of cable 76, a five bit binary coded command designated as command code on 5 lines identified by reference numeral 80, a QDPY pulse on line 78, and a QINT pulse on line 82. Control signals received by extended memory controller 18 by means of control bus 85 are a QDA pulse on line 90 and a QPIN pulse on line 84. The control signals identified in the preceding description correspond to the signals designated as addr. lines (18 bits/chan.), CMD code lines & Prot. line (5 bits/chan.), DBL. Prec./rewrite line (1 $DP/chan.), Chan. Int. Line $I, $DA, and $Pin in the previously cited pending patent application.

The address applied to the memory controller comprises 24 bits. The first bit of the address is termed the most significant bit and the last bit is termed the least significant bit of the address. The bits between the most and least significant bits are accorded successively decreasing orders of significance. The entire binary numeric address represents a number of 24 bits. The first bit of the address lines delivered on line $A_0$ as illustrated in FIG. 5 is the most significant bit and the twenty-fourth bit delivered on line $A_{23}$ is the least significant bit. The remaining bits are accorded successively decreasing orders of numerical significance, depending on their respective positions between the most and least significant bits. The twenty-fourth bit of the binary numeric address represents $2^0$, the decimal number 1, when the twenty-fourth bit is a binary 1. The twenty-third bit represents $2^1$, the decimal number 2, when the twenty-third bit is a binary 1. The twenty-second bit represents $2^2$, the decimal number 4, when the twenty-second bit is a binary 1.

Address lines of cable 76 provide 24 address signals; however, only the signals representing the 18 least significant address bits are accepted by the memory controller of the illustrated embodiment. Addressing as described hereinafter will be presented utilizing a 24 bit address.

Addresses from DCW register decoder 46 are selectively transferred through gates 116 and 174 to control bus 85 in response to signals on lines 120 from main memory control 44. Gate 182 is also enabled by signals on lines 120 to provide a binary 1 signal on address line $A_{22}$ during main memory information transfer operations. This has the effect of incrementing the main memory address by 2 during every 4 word transfer operation with main memory.

Control bus 85 provides one remaining control signal not described in the preceding description or illustrated in the waveforms of FIG. 7. As shown in FIG. 3, a signal designated QCN1 is provided on line 88 of control bus 85. The QCN1 signal is supplied by memory controller 30 during operating system initialization of extended memory controller 18 to perform a desired operation. When a QCN1 signal is present on line 88 and applied to PCW decoder 42, the PCW supplied on N bus 74 in response to the operating system is decoded. Signals resulting from the decoded PCW either initiate operation of extended memory controller 18 or provide for an emergency disconnect operation to terminate an operation in process as designated by bits 18 and 19 of the PCW.

PCW decoder 102 receives bits 18 and 19 of a PCW from memory controller 30 as provided by N bus 74 lines designated as N18, 19 in FIG. 3. Bits 18 and 19 are decoded during initiation of the operation of extended memory controller 18 when a QCN1 signal is received from memory controller 30 on line 88. The decoded binary configuration provided by bits 18 and 19 may specify one of the operations, shown in the following table, to be performed by extended memory controller 18.

| Bits: 18 19 | Operation |
|---|---|
| 0 0 | Emergency Disconnect. |
| 1 0 | "Start," Retrieve Data Control Word Pair. |
| 0 1 | Housekeeping Operation. |

N bus 74 provides for entry of both PCW's and DCW's into extended memory controller 18. Each PCW controls the extended memory controller while each DCW pair provides for control of main and extended memories. If a housekeeping operation is specified by bits 18 and 19 of a peripheral control word, an operation not material to this invention is performed. For an emergency disconnect operation, the extended memory controller must be in a busy state and the signal at output of PCW decoder 42 is designated as G46 in FIGS. 5 and 6. The G46 signal is applied to maintain memory control 44 and DCW register decoder 46 to control termination of operation. With reference to FIG. 5, if a "start" retrieve data control word pair operation code is specified by bits 18 and 19, a QCON signal is provided on line 196 to DCW register decoder 46 to enable OR-gate 104 and AND-gate 106 for providing transfer of 18 binary signals on 18 lines, designated in FIG. 5 as DCW relative address lines, into R register 96. The DCW relative address in R register 96 is thus available to address main memory during a DCW retrieval operation. The QCON signal is also applied on line 196 to main control matrix 112 of main memory control 44 to initiate a DCW retrieval operation.

In the waveforms illustrated in FIG. 7, the information, address, and control signals that the memory controller receives from extended memory controller 18 during main memory access cycles are identified. The information and control signals that the memory controller transmits to the extended memory controller 18 during main memory access cycles are also identified. In the system of the instant invention, the extended memory controller is capable of issuing main memory cycle commands to the memory controller. Two of the main memory cycle commands are to be described in detail hereinafter. The commands are represented by five signals representing a five bit binary code. Signals representing the five bit binary code are transmitted by means of command lines 80 to the memory controllers 28 or 30. These commands are designated as RRS, DP and CWR, DP in FIG. 7 and hereinafter in the structural and operational descriptions of main memory control 44. FIGS. 3, 5, 6 and 7 will be referred to in the following descriptions of communications between a memory controller and an extended memory controller for controlling the access to one of memories 20–23.

Following receipt of a PCW initiating a "start," retrieve data control word pair operation, the extended memory controller is always in one of two phases, each requiring control of main memory; the retrieve data control word cycle or the control cycle. In the retrieve data control word cycle, the extended memory controller 18 retrieves a pair of DCW's from a pair of storage locations in one of memories 22 or 23, transfers the function portion to F register 152 of the DCW register decoder 46 to determine the type of control cycle to be entered. In the control cycle, the extended memory controller 18 controls the type of storage operation to be performed by one of memories 22 or 23 and extended memory 36 under control of the function signals provided by F register decoder 154. The particular type of storage operation to be provided by memories 22 or 23 and extended memory 36 is determined by one of two signals which is present at the output of decoder 154; namely, RDY or WRY.

Main memory control 44, FIG. 6, comprises a four stage J counter 114 comprising four flip-flops to provide control signals during all transactions with memories 22 or 23. The J counter in its defined states J02, J01 or J00 is used to provide control during four 36 bit word transfers to and from memories 22 or 23, while in its defined states J03 and J05 are used to provide signals for housekeeping and retrieval of DCW's from memories 22 or 23 respectively. K counter 115 is a two stage counter comprising two flip-flops to provide control signals during a four word double precision data transfer to memories 22 or 23. The K counter in its defined states of K00, K01 and K02 provides control signals for transferring the third and fourth 36 bit words during a four word transfer to and from memories 22 or 23.

Main control matrix 112 receives signals from PCW decoder 42 on lines 191 and 196 to preset the J counter to a state of J00 or J05 when a PCW is received and decoded to initiate a specified operation. Main control matrix 112 also receives the previously described DIS, RDY and WRY signals from F register 152, with other signals to be described in detail hereinafter to preset and decrement the K and J counters during or following four word memory transfers. K and J decoder 118 decodes the output signals from flip-flops of the K and J counters to provide K01, K02, K00, K21, J00, J01, J02, J21, J03 and J05 timing signals for distribution to logic blocks throughout extended memory controller 18. The K21 and J21 signals designate that the K and J counters are in the K01 or K02 and J01 or J02 states respectively.

Address count control matrix 158 in conjunction with flip-flops FFY and FFZ and gate 184 provides for incrementing the address represented by the contents of A register 144 by a count of 4 following each four word transfer of information involving memories 22 or 23.

Control for transferring a pair of DCW's from memories 22 or 23 is provided by the J counter J05 state and a flip-flop 132 designated LAS FF. When the LAS flip-flop is in a reset state, and AND-gate 134 is enabled by a QDA signal provided by memory controller 30 to indicate that DCW1 is present on N bus 74 from memory controller 30. The output signal from gate 134 is designated as QNST. When the QNST signal is a binary 1, it enables gates 138 and 140 of DCW register decoder 46, FIG. 5, to transfer signals representing the extended memory address and data address of DCW1 into the S and A registers respectively, of decoder 46. Signals representing the data address are transferred into the A register for storage in flip-flops representing the 18 most significant address bits while the QNST signal is applied directly to the A register to reset flip-flops representing address bits $A_{18}$–$A_{21}$ to their binary 0 state. The QNST signal is also applied to the S input of LAS flip-flop 134 to provide for switching flip-flop 132 to its binary 1 state. Gate 146 is enabled by the coincidence of LAS FF 132 being in the binary 1 state and a QDA signal which is received from memory controller 30 indicating the presence of DCW2 on the N bus lines 74. Gate 146 in its enabled state provides a binary 1 output signal designated QNFL. The binary 1 QNFL signal enables gates 104, 106 and 150. Gates 106 and 150 in their enabled state provide output signals to control transferring the function code and DCW relative address portions of DCW2 into the F and R registers respectively.

Encoder 122 responds to J03, J05, J21, K21, RDY and WRY signals to apply a five bit binary coded command, by means of lines of cable 80, to memory controller 30. Outputs from encoder 122 designated as CP, CA, CB, CC and CD, FIG. 6, are applied to lines of cable 80 for transmittal to memory controller 30. The commands generated in extended memory controller 18 which are described in the following description are the read-restore, double precision hereinafter designated as RRS, DP and clear-write, double precision hereinafter designated as CWR, DP. With five command code lines available it is possible to generate as many as 32 different 5 bit combinations to represent commands. The binary coded output signals for RRS, DP and CWR, DP are as follows:

|  | Output Lines | | | | |
|---|---|---|---|---|---|
|  | CP | CA | CB | CC | CD |
| Command: | | | | | |
| RRS, DP | 1 | 0 | 0 | 0 | 1 |
| CWR, DP | 1 | 0 | 1 | 0 | 1 |

The extended memory controller and memory controller exchange control and information signals as illustrated by the main memory timing signal waveforms of FIG. 7 for the RRS, DP and CWR, DP commands.

Double precision control matrix 180 and interrupt control matrix 110, FIG. 6, provide output signals QDPY on line 78 and QINT on line 82 respectively in a timed relationship to the QDA and QPIN signals received on lines 90 and 84 respectively from memory controller 30. The QDA signal indicates that data signals from main memory can be entered into the extended memory controller or that data signals from the extended memory controller have been received. The QPIN signal indicates that the address and command signals have been accepted by the memory controller. The extended memory controller interrupts memory controller 30 and requests an operation by means of transmitting the QINT signal, generated by enabling interrupt control matrix 110, which serves as an access request signal. The QDPY signal is used during a CWR, DP function to indicate to memory controller 30 that the second 36 bit data word is now present on data lines 86. Further explanation of the timing signals will be given in the detailed operation description hereinafter utilizing RRS, DP and CWR, DP commands.

Extended memory controller 18 transmits one 36 bit word at a time to memory controller 30 over 36 data lines designated as U bus 74, 24 address bits over 24 address lines 76, a double precision rewrite signal over one line 78 designated as QDPY, and five command code signals over lines within cable 80 to provide control communication enabling the controller to control a retrieval or storage operation by an addressed memory 22 or 23. The 36 data lines of U bus 74 present a 36 bit data word to the memory controller for storage of the information in one of memories 20–23. The address lines include a 24 bit address which selects a 72 bit word contained in two locations with consecutive addresses in memories 20–23. The least significant address bit is utilized to retrieve or store either the upper or lower half of the 72 bit word that is stored or retrieved in memories 20–23.

Control panel base address switches 94 shown in FIG. 3 are conventional manual switches which may be set to apply 18 binary signals to base address lines 98. The signals present on lines 98 are utilized by extended memory controller 18 to form absolute addresses as will be described hereinafter during a description of DCW register decoder 46.

Each memory controller is associated with a plurality of memories. As previously described, the memory controller in the illustrated embodiment utilizes an 18 bit address thereby rendering it possible for a single memory controller to provide addresses for controlling access to 256K locations or alternately for a group of memory controllers to collectively access a total of 256K locations. The memory addressing concept utilized is such that when the address number specifies a higher numbered addressable location than is contained within memory 22, memory 23, which contains locations with higher address numbers, automatically receives the address. For example, if two 32K memories are coupled to a memory controller, when the address exceeds 32K the locations in the second memory, which contains locations with addresses of 32K–64K, are automatically addressed. The memory controller and its associated core systems operate on a 72 bit basis and a 72 bit word is address numbers, automatically receives the address. The 72 bits correspond to two instructions, two operand words, or two control words. The memory controller receives commands from the communicating devices and once a communicating device has been awarded access the command sent by it to the memory controller is decoded and performed.

Extended memory 36 may be of a type well-known in the art. Extended memory 36 is illustrated in FIG. 3 as comprising a storage unit which is, by way of example, in the form of six rotatable magnetic discs 37 with fixed read write heads 38. It is understood that the memory may be in the form of a set of magnetic discs or a magnetic drum or it may assume any other suitable known configuration or design. In the following description the extended memory storage unit will be referred to hereinafter as a drum storage unit.

Extended memory 36 is operated in a parallel manner such as described in Digital Computer Fundamentals, Thomas C. Bartee, Lincoln Laboratory, MIT, published by McGraw-Hill Publishing Company, Inc., 1960, pp. 239–243. During parallel operation 16 bits are written simultaneously or read simultaneously. When the extended memory is read from or written into in parallel, a separate read and write amplifier is required for each track that is used simultaneously.

Therefore to read 16 bits each bit time, 16 read amplifiers 66 are provided. To write 16 bits each bit time, 16 write amplifiers 68 are provided. As the drum rotates, a small area continually passes under each or read/write heads 38. This area is known as a track. Each track length is subdivided into cells, each of which can store one binary bit. A plurality of successive cells are grouped together to provide addressable areas known as sectors, wherein each sector contains a predetermined number of data words. In the particular example under consideration a sector is comprised of a block of 64 words of 36 bits each.

Information to be transferred between extended memory 36 and memory 22 is stored in a plurality of adjacent tracks 60 and in a plurality of sectors 62 in each of the tracks 60 of rotating discs 37. Sixteen such adjacent tracks are grouped together to provide track sets, FIG. 3. Since there are a number of track sets, the correct set of 16 read/write heads 38 associated with each track set as well as the sector of the tracks must be addressed. Each track set is therefore assigned an address representing the number of the track set and each sector assigned an address representative of the number of the sector. In order to specify the address of a sector, the track set address and sector address are specified and stored, for example, in an address register. The track set address is included in DCW1, FIG. 2, in bit positions 0–9 and applied to track address selection matrix 50, FIG. 3. Track address selection matrix 50 responds to signals representing the track set address to provide one output signal for simultaneously activating a selected set of 16 heads. Appropriate sector selection means is included in the synchronization control 48 to select the proper sector containing the desired information words. The sector address is included in DCW1 as illustrated in FIG. 2 in bit positions 10 through 17.

Extended memory controller 18 locates the specified sector by employing three waveforms representing timing signals as illustrated in FIG. 8 to locate the specified sector. These three waveforms are received from timing signal sources 49 of extended memory 36. The QCLM master clock waveform represents a series of timing signals, each signal occurring at a time corresponding to the accessibility of a respective bit cell, as the drum rotates. A second waveform identified as the DRS (Drum sector) waveform represents a series of signals. Each signal identified as a "sector" signal appears at a time corresponding to the accessibility of the beginning of each sector as the drum rotates. The sector signals of waveform DRS, are spaced 180 bit cells apart such that the basic sector is 180 bit cells in length. In addition, a third waveform designated as the DRA (Drum Sector Address) waveform provides signals representing the sector number of the next accessible sector along the track. Immediately following each of the previously described sector signals the extended memory controller receives the sector numbers or addresses from the DRA waveform. The extended memory controller serially reads the waveforms representing the sector number and when this number agrees with the representation of the sector number stored in the S register, the extended memory controller can then control the reading or writing of information in the addressed sector.

The DRA waveform, FIG. 8, also includes a pair of signals designated as end sector-end write (DAD) and end sector-end read (DAD). The end sector-end read signal controls termination of read operations. The end sector signals control terminating data transmission if the transmission has not already been terminated by reason of some other condition. The end sector-end write (DAD) signal represents the completion time for writing data into extended memory 36 while the end sector-end read (DAD) signal represents the completion time for reading data from extended memory 36. The storage space utilized in each sector is thus defined by the end sector signals. When an end sector signal is sensed, control is provided for terminating the transmission of data.

Communciations between the extended memory controller and extended memory 36 are provided by means of a cable designated as line 35 in FIG. 1 which will hereinafter be referred to as cable 35. Cable 35 comprises the plurality of lines and cables illustrated in FIGS. 3 and 5 which include lines to extended memory 36 designated as track set addr. (10 lines), cable 51, contained within cable 35, write enable line 195 and 16 data lines 69. Cable 35 also includes lines from extended memory 36 providing the three waveforms previously described and received on 3 lines of a cable, designated as QCLM, DRA and DRS, and 16 data lines 67 conncected to shift registers 64.

Control of a rotating type memory is well-known in the art. Synchronization control 48 receives the three waveforms as previously described, from extended memory 36 and insure sampling of information bits at DCW register decoder 46, FIG. 5, stores the sector address of the desired sector. Synchronization control 48 compares the sector address portion of the S register with each of the series of addresses received on the DRA line from the extended memory 36 until coincidence is achieved. For example, in the illustrated embodiment, a series of 8 binary signals designated as "address" on the DRA waveform in FIG. 8 and providing a representation of a sector number, is supplied at the beginning of each sector by extended memory 36. The representation of the sector number is then compared with the sector address contained in the S register until coincidence is obtained.

Within synchronization control 48 is a counter comprised of four flip-flops (not shown) which is designated as the Q counter that provides timing signals Q00–Q05 in the sequence shown by the timing diagram of FIG. 8. The Q counter is a conventional counter, which is incremented one count for each change of operation to provide the states indicated in the following table.

| Q counter state: | Control operation |
| --- | --- |
| Q00 | Rest state. |
| Q01 | Compare sector address. |
| Q02 | Read-rest time. / Write-retrieve 4 words from main memory. |
| Q03 | Read or write data. |
| Q04 | Read or write data. |
| Q05 | Parity checking. |

The Q counter provides control signals during all transactions with extended memory 36. A signal designated as Q34 is also provided which indicates that the Q counter is in a state of Q03 or Q04.

Synchronization control 48 also includes a conventional timing signal distributor, such as for example, a ring shift register or counter (not shown) which is suitable for providing 9 bit timing signals $P_0$–$P_8$ corresponding to each binary 1 portion of the clock signal provided by the QCLM waveform, FIG. 8. The P timing signals are illustrated in FIG. 8 and are supplied throughout extended memory controller 18 to time various operations as will be described hereinafter. P timing signals provide synchronism with the address waveform extended memory 36 and insure sampling of information bits at the proper time. The time interval for the occurrence of the $P_0$ through $P_8$ signals represents the extended memory 9 bit interval termed a "character time," therefore all shifting of shift registers 64 is controlled by shift signals generated under control of P timing signals. The parallel transfer of information between the shift registers and holding registers is also controlled by the P timing signals.

Transfer of information within extended memory controller 18 is provided by data transfer control matrix 156 and transfer gates 172 which provide for parallel transfer of information between the shift registers and holding registers. Data transfer control matrix 156 also provides control signals for controlling the transfer of information between the holding registers and the N and U buses.

Data transfer control matrix 156 receives RDY, WRY, K01, K02, J01, J02, J05, J00, P6, Q02, Q34 and end of sector signals from DCW register decoder 46, main memory control 44, synchronization control 48 and extended memory 36. Data transfer control matrix 156 responds to these signals to provide timing signals during information transfer operations as described in the operation description hereinafter.

Holding registers 174 have a capacity of four 36 words or a combined length of 144 flip-flops. They are used as buffer or holding registers for the four words transferred in a main memory information transaction. Since each register contains 36 bits, data transfer control matrix 156 supplies separate control signals for each register during a transfer between main memory and the holding registers. As shown in FIG. 3, four signals designated as QNC0, QNC5, QPD0 and QPD5 are applied to 4 lines within cable 186 and four signals designated QC$\phi$U, QCBU, QD$\phi$V and QDBV are applied to 4 lines within cable 179. The QNC0, QNC5, QPD0 and QPD5 signals are applied successively to separate sets of 36 gates each within data input gates 40 to transfer one 36 bit word at a time into a respective one of first, second, third and fourth registers of holding registers 174. In a similar manner the QC$\phi$U, QCBU, QD$\phi$V and QDBV signals are applied successively to separate sets of 36 gates each within data output gates 41 to transfer one 36 bit word at a time from a respective one of first, second, third and fourth registers of four 36 bit holding registers 74 to U bus 86. The QECT signal controls certain ones of transfer gates 172 for transferring signals representing the contents of the 16 shift registers to the four holding registers. The combined shift registers are comprised of 144 flip-flops and are used as extended memory information buffer registers. Each of the 16 shift registers are nine bits in length. During a write operation by extended memory 36, information bits are shifted out of the least significant bit position of each nine bit shift register to the extended memory on data lines 69 by shifting each shift register in response to clock shift signals provided from gate 170 of the DCW register decoder 46, FIG. 5. During a read operation, information bits are entered into the most significant bit positions of the shift register from extended memory data lines 67 by these same shift signals. These shift signals occur at the frequency of the master clock (QCLM) signals. Transfer of data to the holding registers is controlled by transfer gates 172 which are comprised of two separate sets of 144 gates to provide for parallel transfer of the shift register contents to and from the holding registers in response to signals applied by data transfer control matrix 156.

When a pair of DCW's are retrieved from main memory, gates 138, 150, 140 and 106, FIG. 5, are selectively enabled as peviously described to transfer portions of DCW1 and DCW2 into the S, F, A and R registers. Addresses for main memory are provided by the A and R registers 96 and 144, Adder 100, and control panel base address switches 94. The base address switches provide 18 binary input signals representing a base address, which are applied to adder 100 by means of cable 98. The R register is an 18 bit register used to store the relative address of the next DCW pair to be retrieved from main memory by the controller. The 12 most significant bits designated $R_0$–$R_{11}$, in the R register are added to the 12 least significant bits of the base address signals on cable 98 to form the 18 most significant bits of the absolute address of the next DCW pair. The 6 signals representing the 6 least significant bits of the R register are applied unmodified to gates 116 to form the remaining 6 bits of the 24 bit absolute address. Since each DCW pair provides a link address specifying the next DCW pair location, the extended memory controller can continue retrieving data control words and transferring data between memories without program attention. When the controller is in the not busy state, and a QCN1 signal is received, the relative address is loaded from the PCW accompanying the QCN1 signal as previously described. Adder 100 is a conventional parallel binary adder which forms the sum of an 18 bit operand and a 12 bit operand provided by the control panel base address switches 94 and R register respectively.

The A register 144 is comprised of 22 flip-flops for storing binary bits representative of the main memory address to be involved in an information transfer. The extended memory controller provides 24 lines of cable 76 designated as $A_0$–$A_{23}$ representing a main memory data address, to the memory controller. The A register flip-flops are coupled only to lines designated as $A_0$–$A_{21}$ of cable 76. During an information transfer, the twenty-fourth line ($A_{23}$) corresponding to the least significant bit of the data address always has a binary 0 signal applied, since the main memory cycle will always be double precision requiring an even numbered address. The twenty-third line ($A_{22}$) corresponding to the seventeenth bit of the data address has a binary 0 signal applied during transfer of the first word pair of a four word transfer and a binary 1 signal applied during the transfer of the second word pair in a second double precision cycle. At the end of a four word transfer, the A register is incremented by one, by the QACT pulse from main memory control 44. The QACT pulse is applied to each flip-flop of the A register, which performs as a counter, to increase the A register count by 1 in a manner well-known in the art. Since the twenty-second line ($A_{21}$) corresponding to the twenty-second bit of the data address receives the output signal from the A register flip-flop representing the twenty-second address bit, the address portion supplied by the A register is actually increased by a count of 4.

S register 142 is comprised of 18 flip-flops for storing bits representative of the extended memory address of information to be involved in an information transfer operation. The most significant 10 bit track portion designated as bits 0–9, FIG. 5, select the required track set. The least significant 8 bits sector portion designated as bits 10–17 are used to select the required sector. The track portion is applied on lines 51 to track address selection matrix 50 of extended memory 36 immediately following transfer of DCW1. The least significant 8 bits of the S register are for example, in the illustrated embodiment applied to synchronization control 48 for serial comparison with the extended memory sector address supplied by waveform DRA of FIG. 8. Comparison of the sector address provided by the DRA waveform from extended memory 36 is provided during the Q01 state of the Q counter which provides for the sector address compare time.

DCW register decoder 46 includes the F register 152 which is comprised of five flip-flops, whose states are decoded by F decoder 154 to provide signals DIS, RDY, and WRY function signals to control the type of storage operation of both main and extended memory. The F register also receives a signal designated as a G46 signal, to be described hereinafter, from PCW decoder 42 to provide for resetting all of the F register flip-flops to obtain an all zero binary configuration when a PCW specifies a disconnect operation.

Control of extended memory 36 to perform a read or write operation is provided by write flip-flop 190 hereinafter referred to as write FF 190 as illustrated in FIG. 5. When a binary "1" WRY signal is applied to AND-gate 188 conjunctively with the presence of binary "1" signals at $P_6$ and Q02 times, gate 188 is enabled to provide a binary "1" output signal. The binary "1" signal is applied to the S input of write flip-flop 190 thereby setting flip-flop 190 to its binary "1" state for providing a binary "1" output signal designated as "write enable" on line 195. The binary "1" "write enable" signal is applied to enable gated write amplifiers 68, FIG. 3. Therefore, write FF 190 provides operation control of extended memory 36 by enabling write amplifiers 68 to provide signals to be written by a selected set of 16 read/write heads on discs 37. At the completion of a "write" operation specified by a DCW pair, wherein the WRY binary 1 signal is present on one input of AND-gate 194 conjunctively with binary "1" signals at $P_0$ time and Q05 time gate 194 is enabled. Enabled gate 194 provides a binary 1 output signal to the R input of write FF 190 thereby switching the flip-flop to its reset state providing a binary 0 output signal on line 195 to write amplifiers 68. Write amplifiers 68 are disabled by the binary 0 signal to prevent further writing of information on discs 37. During a read operation the write FF remains in a binary 0 state and write amplifiers 68 are inactive. Thus, the F register output provides for controlling the type of operation to be performed by extended memory 36.

DCW by register decoder 46 also provides control for applying shift signals to sixteen 9 bit character shift registers during read or write operations. AND-gate 170 receives on one input line, the QCLM waveform and provides output shift signals corresponding to each clock binary 1 signal to each of the 16 shift registers on line 171 during its enabled state. AND-gate 170 is enabled during a read operation for each binary 1 input signal provided by the QCLM waveform during the time when the Q counter is in states Q03 or Q04. During a write operation, AND-gate 192 and inverter 169 serve to inhibit gate 170 during $P_6$ time to prevent providing a shift signal at $P_6$ time when new information is being transferred in parallel from the holding registers to the shift registers. AND-gate 192 provides a binary "1" output signal during $P_6$ time to inverter 169 which in turn provides a binary "0" output signal. The binary "0" signal is applied to gate 170 for inhibiting the enabling of gate 170 during every $P_6$ time of a write operation.

Further details of the logic of extended memory controller 18 will be described in the following operational descriptions covering the retrieve data control word cycle of operation and control of the execution of pairs of DCW's specifying read and write operations.

Operating system program initiation of extended memory controller 18 to perform an operation is provided by a computer of a data processing system, such as in the system illustrated in FIG. 1, executing a connect instruction. Execution of the connect instruction results in one of memory controllers 28 or 30 retrieving a PCW from one of memories 20–23. A memory controller, such as memory controller 30, responds to the instruction to retrieve a PCW from one of memories 22 or 23, generates and supplies a QCN1 signal on line 88, FIG. 3, and supplies the signals of a PCW on lines 0–35 of N bus 74. Three N bus lines providing signals corresponding to bits 18 and 19 of the PCW are connected to PCW decoder 42 and the QCN1 signal is also applied to PCW decoder 42. The timing diagram of FIG. 9, illustrating the conditions relating to a peripheral control word program start sequence which is an operation performed by extended memory controller 18 and specified by a PCW for starting the retrieval of a DCW pair. Peripheral control word decoder 42 responds to the QCN1 signal and a binary 1 signal on N line 18 corresponding to bit 18 of the PCW received to generate a QCON signal.

As shown in FIG. 9 the extended memory controller is in a rest state, indicated by the F register containing all zeros and the J and Q counters being in their J00 and Q00 states at the time of receiving the PCW specifying a "start," retrieve data control word pair operation. PCW decoder 42 decodes bits 18 and 19 when the QCN1 signal is binary 1 and when bit 18 is a binary "1" to generate the QCON signal. The QCON signal is transmitted on cable 108 to DCW register decoder 46, FIGS. 3 and 5, to enable gate 104 which in turn enables gates 106, the R register transfer gates, to transfer signals on N bus lines 0–17 corresponding to bits 0–17 of the PCW into R register 96. As described previously bits 0–17 of the PCW provide the relative address of the location of main memory containing the first of a pair of DCW's.

The QCON signal is also applied by means of line 190, FIG. 6, to interrupt control matrix 110 of main memory control 44 to generate a QINT signal which is applied on line 82 through control bus 85 to memory controller 30.

The QCON signal is also applied to main control matrix 112. In response to the QCON signal, matrix 112 provides signals for presetting J counter 114 to a state of J05, which is the J counter state providing control signals for a retrieve data control word cycle.

The J05 signal applied to encoder 122 provides for a command code consisting of a 10001 binary signal combination at the output of encoder 122 on lines designated CP, CA, CB, CC and CD respectively. This binary configuration corresponds to a RRS, DP command which is applied by means of the five command code lines 80 through control bus 85 to memory controller 30. Since the DCW relative address from the PCW has previously been entered into R register 96 and the 12 most significant bits applied to adder 100 along with the 18 bit base address on lines of cable 98 from control panel base address switches 94, the sum at the output of adder 100 represents the 18 most significant bits of absolute main memory address of the location containing the first of a pair of DCW's. The 18 line output of adder 100 and six least significant bits of the R register are then present at gates 116 in conjunction with the J05 signal on line 120 to enable gates 116 to transfer the 24 bit DCW absolute address signals to address lines 76 and applied through control bus 85 to memory controller 30.

The J05 signal is also applied to synchronization control 48 for presetting the Q counter to a state of Q00 in anticipation of a DCW specified transfer operation. The LAS flip-flop 132 of FIG. 6 is always in the binary 0 state, following a previous retrieval of DCW pairs, as will be described hereinafter. A binary 0 output signal from LAS flip-flop 132 is therefore applied in conjunction with the J05 signal on lines coupled to gate 134.

Memory controller 30 responds to the QINT signal which serves as a request for access from extended memory to provide a double precision memory cycle utilizing the command code and address provided by controller 18 for retrieving a pair of DCW's from the specified memory location. During a double precision cycle for retrieval of two 36 bit words, the memory controller provides a QPIN signal acknowledging receipt of the command and address signals from control bus 85. Following the retrieval of a pair of data control words by the memory controller from a pair of locations in one of memories 22 or 23, the memory controller transmits a QDA signal indicating that DCW1 is present on N bus 74 for transfer to the extended memory controller as illustrated in FIG. 7. The QDA signal in conjunction with the J05 and the LAS flip-flop binary 0 output signal enable AND-gate 134 to generate a QNST signal which is applied by means of line 136 to gates 138 and 140 of DCW register decoder 46, FIG. 5.

Since the signals representing DCW1 are now present on N bus 74, the QNST signal on line 136 enables gates 138 and 140 to transfer the signals present on N bus 74 lines corresponding to DCW1, bits 0–17 into S register 142 and DCW1 bits 18–35 into the 18 most significant bit positions of A register 144. The QNST signal is also applied to A register 144 for resetting the flip-flops providing signals representing the 18–21 bits of the data address. The A register now contains the address of a location in one of memories 22 or 23 coupled to memory controller 30. The QNST signal is also applied to the S input of the LAS FF to set the LAS FF into its binary 1 state. Following a predetermined delay time, memory controller 30 applies a second QDA signal on line 90 which indicates that DCW2 is now present on N bus 74. The QDA signal is applied to gate 146 in conjunction with the J05 signal and binary 1 output of the LAS FF to enable gate 146 thereby providing an output binary 1 signal designated QNFL on line 148. The J05 signal and binary 1 output signal from LAS FF enable interrupt control matrix 110 of FIG. 6 to provide a QINT pulse to memory controller 30 by means of line 82 to provide for the next main memory access on control bus 85. A request for main memory access is thus provided in advance of the next main memory transaction.

The QNFL signal on line 148 provides for transfer of portions of DCW2 into extended memory controller 18 when applied to inputs of gates 104 and 150, FIG. 5. OR-gate 104 is enabled by either a QCON signal or QNFL signal to in turn enable gates 106 to transfer the signals of DCW2 which are applied to gates 106 from N bus 74 such that DCW2 bits 0–17 are transferred into the R register. The QNFL signal on line 148 also enables gates 150 to transfer DCW2 bits 18 through 22 into F register 152, switches the LAS flip-flop to its binary 0 state. Before the LAS flip-flop is switched to its binary 0 state, its binary 1 output signal is applied to main memory control matrix 112 in conjunction with QDA and J05 signals to preset J counter 114 to a state of J03. The F register now contains a five bit binary code designating a particular type of operation to be controlled by the extended memory controller. F decoder 154 responds to the binary configuration in the F register to provide an output signal designating a disconnect, read, or write operation as previously described.

With J counter 114 in the J03 state, a housekeeping operation requiring a main memory access is performed, an understanding of which is not necessary for an understanding of this instant invention. This main memory access requires communication with the memory controller 30 and provides a resulting QDA signal on line 78 which is utilized in conjunction with the J03 signal from K and J counter decoder 118, FIG. 6, to advance the extended memory controller 18 into a control state for controlling the execution of the operation represented by the decoded output of the F register.

To illustrate the sequence of action by the extended memory controller during execution of a data control word including a function code representing a read operation, Table I is provided.

TABLE I.—DATA CONTROL WORD, READ OPERATION

[F Register Contents=11000 (RDY)]

| Q Counter State | J and K Counter States | Control Signals | Action |
|---|---|---|---|
| Q00 | J03, K00 | QDA·RDY | Preset J and K counters=J00 and K00. Reset FFY and FFZ flip-flops to binary 0 state. |
| Q00 | J00, K00 | DRS | Enable address comparator. Enable time signal distributor to generate $P_0$-$P_8$ signals in response to the QCLM clock signals. Increment Q counter=Q01. |
| Q01 | J00, K00 | DRA·QCLM·$\overline{P_8}$ | Compare sector address of S register with address from access control. |
| Q01 | J00, K00 | $P_8$ | Check for address comparison. If comparison is achieved increment Q counter=Q02. |
| Q02 | J00, K00 | $P_8$·RDY | Increment Q counter=Q03. |
| Q03 | J00, K00 | QCLM | Shift data from tracks into shift registers: Increment Q counter=Q04. Parallel transfer of contents of shift registers to holding registers. |
| Q03 | J00, K00 | $P_8$·RDY | Preset J and K counters=J02 and K02. Set FFY and FFZ flip-flops to binary 1 state generate and apply QINT signal to memory controller. Generate and apply CWR, DP (10101) signals to command lines for transmittal to memory controller. Transfer A register output signals to address lines 0-17. |
| Q04 | J02, K02 | RDY | Transfer 1st holding register output signals to U bus. |
| Q04 | J02, K02 | QDA·RDY | Decrement J counter=J01. Transmit a QDPY signal to memory controller. |
| Q04 | J01, K02 | RDY | Transfer 2nd holding register output signals to U bus. Apply a binary "1" to address line 16. |
| Q04 | J01, K02 | QPIN | Generate and Apply QINT singal to memory controller. |
| Q04 | J01, K02 | QDA | Decrement J counter=J00. Reset FFY flip-flop to binary 0 state. |
| Q04 | J00, K02 | RDY | Transfer 3rd holding register output signals to U bus. |
| Q04 | J00, K02 | QDA | Decrement K counter=K01. Transmit a QDPY signal to memory controller. |
| Q04 | J00, K01 | RDY | Transfer 4th holding register output signals to U bus. |
| Q04 | J00, K01 | QDAY | Decrement K counter=K00. Reset FFZ flip-flop to a binary 0 state. |
| Q04 | J00, K00 | $\overline{FFY}$·$\overline{FFZ}$ | Generate a QACT signal. |
| Q04 | J00, K00 | QACT | Add 4 to A register. |
| Q04 | J00, K00 | $P_8$·RDY | Parallel transfer of signals from shift registers to holding registers. Preset J and K counters=J02 and K02. Set FFY and FFZ flip-flops to binary 1 state. Generate and apply QINT signal to memory controller. Generate and apply CWR, DP (10101) signals to command lines. Transfer A register output signals to address lines 0-17. |
| Q04 | J02, K02 | RDY | Transfer 1st holding register output signals to U bus. |
| Q04 | J02, K02 | QDA | Decrement J counter=J01. Transmit a QDPY signal to memory controller. |
| Q04 | J01, K02 | RDY | Transfer 2nd holding register output signals to U bus. Apply a binary "1" to address line 16. |
| Q04 | J01, K02 | QPIN | Generate and apply QINT signal to memory controller. |
| Q04 | J01, K02 | QDA | Decrement J counter=J00. Reset FFY flip-flop to binary 0 state. |
| Q04 | J00, K02 | RDY | Transfer 3rd holding register output signals to U bus. |
| Q04 | J00, K02 | QDA·RDY | Decrement K counter=K01. Transmit a QDPY signal to memory controller. |
| Q04 | J00, K01 | RDY | Transfer 4th holding register output signals to U bus. |
| Q04 | J00, K01 | QDA | Decrement K counter=K00. Reset FFZ flip-flop to binary 0 state. |
| Q04 | J00, K00 | $\overline{FFY}$·$\overline{FFZ}$ | Generate a QACT signal. |
| Q04 | J00, K00 | QACT | Add 4 to A register. |

Perform sequentially the actions of Q04 J00, K00 $P_8$·RDY through Q04 J00, K00 QACT repeatedly for 14 times transferring 4-36 bit words each repeated operation.

TABLE I—Continued

| Q Counter State | J and K Counter States | Control Signals | Action |
|---|---|---|---|
| Q04 | J00, K00 | RDY·P₈·DAD | Increment Q counter=Q05. Parallel transfer output signals of shift registers to holding registers. Preset J and K counters=J02 and K02. Set FFY and FFZ flip-flops to binary 1 state. Generate and apply QINT signal to memory controller. Generate and apply CWR, DP (10101) signals to command lines. Transfer A register output signals to address lines 0–17. |
| Q05 | J02, K02 | RDY | Transfer 1st holding register output signals to U bus. |
| Q05 | J02, K02 | QDA | Decrement J counter=J01. Transmit a QDPY signal to memory controller. |
| Q05 | J01, K02 | RDY | Transfer 2nd holding register output signals to U bus. Apply a binary "1" to address line 16. |
| Q05 | J01, K02 | QPIN | Generate and apply QINT signal to memory controller. |
| Q05 | J01, K02 | QDA | Decrement J counter=J00. Reset FFY flip-flop to binary 0 state. |
| Q05 | J00, K02 | P₂·RDY | Preset Q counter=Q00. |
| Q00 | J00, K02 | RDY | Transfer 3rd holding register output signals to U bus. |
| Q00 | J00, K02 | QDA | Decrement K counter=K01. Transmit a QDPY signal to memory controller. |
| Q00 | J00, K01 | RDY | Transfer 4th holding register output signals to U bus. |
| Q00 | J00, K01 | QDA | Decrement K counter=K00. Reset FFZ flip-flop to binary 0 state. |
| Q00 | J00, K00 | $\overline{FFY \cdot FFZ}$ | Generate a QACT signal. |
| Q00 | J00, K00 | QACT | Preset J counter=J05. Generate and apply QINT signal to memory controller. |
| Q00 | J05, K00 | | Go to retrieve data control word cycle: |

If the F register contains a binary configuration of 11000, F register decoder 154 provides the RDY signal, which is applied to main memory control 44 and synchronization control 48.

With the J counter, FIG. 6, in a state of J03 prior to the previously described housekeeping operation, the QDA pulse which is received from memory controller 30 as a result of the housekeeping access is conjunctively combined with a J03 signal by control matrix 112 to provide an output signal for presetting the J and K counters to a state of J00 and K00 respectively. The J03 signal and QDA signals are also applied to address count control matrix 158 which in turn provides signals for switching flip flops FFY 160 to FFZ 162 to their binary 0 states. Since the Q counter of synchronization control 48 has previously been set to a state of Q00 during the previously described retrieve data control word cycle, the Q00 signal and next sector signal occurring in the DRS signal, FIG. 8, conjunctively enable the time signal distributor of synchronization control 48, to start providing P₀–P₈ timing pulses throughout the extended memory controller in synchronization with binary 1 signals of the QCLM clock waveform. At the same time Q counter of synchronization control 48 is advanced to a count of Q01. With the Q counter in a state of Q01 the sector address portion of the S register is compared by the comparator of the synchronization control 48 with the binary configuration comprising the address occurring in the DRA signal.

The comparator of synchronization control 48 serially compares S register bits 11–17 with the sector address occurring in the DRA signal of FIG. 8 bit-by-bit during each P₀–P₇ timing signal and at P₈ time provides a test for comparison by one of the techniques well-known in the art. If the addresses are equal, synchronization control 48 increments the Q counter to a state of Q02. If the addresses are not equal, the Q counter is decremented to the Q00 state to await the presence of the next sector signal to increment the Q counter to a Q01 state and provide another comparison. The Q02 state, following location of the sector, allows a nine timing signal rest period. The next P₈ signal from the timing signal distributor in conjunction with a Q02 signal provides a signal for incrementing the Q counter to a Q03 state. Synchronization control 48 responds to the Q counter in a Q03 state to provide a Q34 signal which is applied to AND-gate 170, FIG. 5. The Q34 signal, the QCLM signal from extended memory 36 and a binary one signal from inverter 169 are applied conjunctively to enable AND-gate 170. With AND-gate 170 enabled, shift signals corresponding to each binary 1 signal of the QCLM signal are applied on line 171 identified as QESR shift signals, to each of the 16 nine bit character shift registers 64. The shift signals are applied to the 16 nine bit character shift registers 64 such that at the P0 signal time the first data bit will be shifted from each of the 16 read amplifiers 66, as received from the 16 tracks selected by track address selection matrix 50, into the first stage of each of the 16 nine bit character shift registers 64. Shift signals will continue to be applied during a read-operation throughout the duration of a Q34 signal with each shift signal occurring in response to a corresponding binary 1 signal of the QCLM waveshape of FIG. 8. At a Q counter state of Q03, and the occurrence of the P₈, J00, K00 and an RDY signals the Q counter of synchronization control 48 is incremented to a state of Q04. Every P₈ signal provided by control 48 hereinafter during a Q counter state of Q04 will indicate that nine shift pulses have been applied to each of the 16 nine bit character shift registers and that a nine bit character is present in each of the shift registers.

The P8 signal is also applied to data transfer control matrix 156 in conjunction with the Q34 signal to provide the QECT output signal, FIG. 3, to transfer gate 172. A set of 144 gates within transfer gates 172 respond to the QECT signal to provide for a parallel transfer of the contents of the 16 nine bit characters shift register 64 to four 36 bit word holding registers 174. Q34, P8 and RDY signals are applied in a similar manner to maintain control matrix 112 which responds to provide output signals to both the K and J counters for setting their respective states to K02 and J02. The Q34, P8 and RDY signals are also applied to address count control matrix 158 of FIG. 6 for providing signals for switching flip flops FFY 160 and FFZ 162 to the binary 1 state. Q34, P8 and RDY signals also enable interrupt control matrix 110 to generate a QINT signal which is transmitted by means of line 82 through control bus 85 to memory controller 30. The K and J decoder 118 outputs J21 and 221 are applied in conjunction with the RDY signal from F decoder 154 to encoder 122 to provide a binary coded command signal 10101 corresponding to CWR-DP command on lines 80 through control bus 85 to memory controller 30. The J21 and K21 signals are also applied by means of lines 120 to enable OR-gate 173 thereby providing a binary 1 signal to gates 174 to provide for transferring signals from A register 144 to address lines 76 through control bus 85 to memory controller 30. Binary 0 signals are always applied from gates 144 to address lines corresponding to bits 22 and 23 of lines 76. The J02, K02, Q04 and RDY signals are now applied to transfer control matrix 156 to generate and provide a QC$\varphi$U signal on lines 179 to data output gates 41 which include a set of 36 gates responsive to the QC$\varphi$U signal to transfer signals of a first holding register through U bus 86 for applying to memory controller 30.

The waveforms of FIG. 7 illustrate that memory controller 30 responds to the QINT pulse on line 82 to provide a cycle started signal $TS internally to the memory controller for initiating a main memory access operation.

Following the cycle started condition within memory controller 30 the command and address lines are sampled and a QPIN signal is transmitted from the memory controller 30 to extended memory controller 18 on line 84 of the control bus to indicate that the command and address lines have been sampled and that the command and address signals may now be removed. The memory controller next samples the signals present on the 36 lines of U bus 74 and provides for storing the first word of the four 36 bit word holding registers 174 in the memory location specified by the address. Since the memory controller can accept only 36 data lines at a time, extended memory controller 18 must transfer the four 36 bit words in holding registers 174 one word at a time and provide control for two successive CWR, DP cycles of memory.

The read operation continues in accordance with the sequence of operation illustrated in Table I.

While four words in holding registers 174 are being stored in working stores 22 or 23 by memory controller 30, the sixteen 9 bit character shift registers 64, FIG. 3, have been receiving shift signals. The shift signals provided through enabled gate 170 as illustrated in FIG. 5 correspond to each binary one signal supplied by the QCLM signal. As illustrated by line 199 in Table I, the shift signals are provided during the time interval that the Q counter remains in its Q03 or Q04 state for a read operation. Therefore, following every nine successive shift signals, the next sixteen 9 bit characters to be transferred to holding registers 174 are present in shift registers 64. At each P8 time during Q03 or Q04 state of the Q counter, data transfer control matrix 156 is controlled to provide a signal for enabling transfer gates 172 to provide a parallel transfer of signals representing the contents of sixteen 9 bit character shift registers 64 to the four 36 bit holding registers 174. Each P8 signal occurring during the Q04 state of the Q counter sets the J and K counters to the J02 and K02 states respectively to provide J21 and K21 signals for the transfer of four words to main memory. The J21 and K21 signals in conjunction with the RDY signal initiate a CWR, DP memory cycle for storing the first two words in holding registers 174 which is followed by a second CWR, DP memory cycle for storing the next two 36 bit words contained in holding registers 174.

This process continues such that for each P8 timing signal or every nine shift signals, four 36 bit words are transferred in parallel from the shift registers to the holding registers and stored within one of memories 22 or 23. Following each four word storage cycle the A register count is incremented by 1 to provide a corresponding increase of 4 in the numerical value of the address signals applied to address lines $A_0$–$A_{23}$. The incremented addresses are representative of memory locations with consecutive addresses for storage of a block of data words, such as for example, a block of 64 data words in one of memories 22 or 23. As previously described, 64 data words are contained within each sector of information transferred from extended memory to main memory.

The shifting of bits into the shift registers and parallel transfer of sixteen characters to four 36 bit holding registers 174 continues until the end of sector signal designated as end sector-end read on waveform DRA occurs as illustrated in FIG. 8. With the Q counter in a state of Q04 and a P8 signal present in conjunction with the end sector-end read (DAD) signal, the Q counter of synchronization control 48 in FIG. 3 is incremented to a state of Q05. At the time when the end sector-end read (DAD) signal occurs at a Q04 and P8 time, the last 16 nine bit characters of an addressed sector have been shifted into shift registers 64. An additional parallel transfer from the shift registers to the holding registers is therefore required and two additional CWR, DP memory cycles must be provided by memory controller 30. The Q05 signal in conjunction with a P2 timing signal provides for presetting the Q counter to a state of Q00 thereby providing a Q00 signal.

After the transfer and storage of four additional 36 bit words, a QACT signal is generated as a result of resetting flip-flops following transfer of the first two words FFY 160 and FFZ 162 following the transfer of the second two words. The QACT signal is utilized in conjunction with the Q00 state of the Q counter to enable main control matrix 112 to preset the J counter to a state of J05. K and J decoder 118 then provides a J05 binary "1" output signal. The J05 signal is then applied to interrupt control matrix 110 to enable the interrupt control matrix to provide a QINT signal on line 182 to memory controller 30. With the J counter in a J05 state, the extended memory controller is in an operating condition for controlling the retrieval of a data control word pair from main memory.

As illustrated by the waveform designated as read data in FIG. 8, data words are read from extended memory 36 during the time interval between the conjunctive occurrence of the P8 and Q03 signals and the conjunctive occurrence of the P8, Q04 and end sector-end read (DAD) signals for a read operation. The end sector-end read (DAD) signal of the DRA waveform of FIG. 8 represents the completion time for reading data from extended memory 36. During the Q05 state of the Q counter and $P_0$, $P_1$ and $P_2$ timing signal times three parity bits are read from extended memory and checked in a manner well known in the art and not material to this invention.

Following the presetting of J counter 114 to a J05 state, and apply a QINT signal to memory controller 30 the retrieve data control word cycle of operation is performed as previously described and as illustrated by the timing diagram of FIG. 9.

The retrieve data control word cycle of operation is performed utilizing the DCW relative address stored in R register 96, FIG. 5, and which was provided by a previous DCW pair.

To illustrate the sequence of action by the extended memory controller during execution of a data control word including a function code representing a write operation, Table II is provided.

If a binary configuration of 11010 is present in F register 152, and the A, R and S registers store data corresponding to addresses received as a result of retrieving a DCW pair, control of execution of a write operation is provided. The output of F decoder 154 provides the WRY signal, which is applied to main control matrix 112 in conjunction with J03 and K00 signals from K and J decoder 118, a Q00 signal from synchronization control 48, and the QDA pulse received as a result of the housekeeping operation requiring a main memory access in response to a J counter state of J03. As previously described, following each retrieval of a DCW pair the extended memory controller performs a housekeeping operation and the J counter assumes a J3 state before controlling the operation specified by the F register contents.

TABLE II.—DATA CONTROL WORD, WRITE OPERATION

[F Register Contents=11010 (WRY)]

| Q Counter State | J and K Counter States | Control Signals | Action |
|---|---|---|---|
| Q00 | J03, K00 | QDA·WRY | Preset J and K counters=102 and K02 Set FFY and FFZ flip-flops to binary 1 state. Generate and apply a QINT signal to memory controller. |
| Q00 | J02, K02 | WRY | Generate and apply RRS, DP (10001) signals to command lines for transmittal to memory controller. Transfer A register output signals to address lines 0-17. |
| Q00 | J02, K02 | QPIN | Generate and apply a QUINT signal to memory controller. |
| Q00 | J02, K02 | QDA·WRY | Transfer signals on N bus lines 0-36 to 1st holding register decrement J counter=J01. |
| Q00 | J01, K02 |  | Apply a binary "1" to address line 16. |
| Q00 | J01, K02 | QDA | Transfer signals on N bus lines 0-36 to 2nd holding register decrement J counter=J00. Reset FFY flip-flop to binary 0 state. |
| Q00 | J00, K02 | QDA | Transfer signals on N bus lines 0-36 to 3rd holding register. Decrement K counter=K01. |
| Q00 | J00, K01 | QDA | Transfer signals on N bus lines 0-36 to 4th holding register. Decrement K counter = K00. Reset FFZ flip-flop to binary 0 state. |
| Q00 | J00, K00 | $\overline{FFY \cdot FFZ}$ | Generate a QACT signal. |
| Q00 | J00, K00 | QACT | Add 4 to A register. |
| Q00 | J00, K00 | DRS | Enable address comparator Enable time signal distributor to generate $P_0$-$P_8$ signals in response to the QCLM clock signal Increment Q counter =Q01. |
| Q01 | J00, K00 | DRA·QCLM·$\overline{P_8}$ | Compare sector address of S register serially with address from extended memory. |
| Q01 | J00, K00 | $P_8$ | Check for address comparison if comparison is achieved increment Q counter=Q02. |
| Q02 | J00, K00 | $P_8$·WRY | Increment Q counter=Q03. Parallel transfer of holding register ouptut signals to shift registers. Preset J and K counters=J02 and K02. Set write flip-flop (enable write amplifiers) to binary 1 state. Set FFY and FFZ flip-flops to binary 1 state. Generate and apply QINT signal to memory controller. |
| Q03 | J02, K02 | WRY | Transfer A register output signals to address lines 0-17. Generate and apply RRS, DP (10001) signals to command lines for transmittal to memory controller. |
| Q03 | J02, K02 | QCLM·$\overline{P_8}$ | Shift data from shift registers to data tracks. |
| Q03 | J02, K02 | QPIN | Generate and apply a QINT signal to memory controller. |
| Q03 | J02, K02 | QDA | Transfer signals on N bus ilnes 0-36 to 1st holding register Decrement J counter=J01. |
| Q03 | J01, K02 |  | Apply a binary "1" to address line 16. |
| Q03 | J01, K02 | QDA | Transfer signals on N bus lines 0-36 to 2nd holding register Decrement J counter=J00 Reset FFY flip-flop to binary 0 state. |
| Q03 | J00, K01 | QDA | Transfer signals on N bus lines 0-36 to 3rd holding register Decrement K counter=K01. |
| Q03 | J00, K01 | QDA | Transfer signals on N bus lines 0-36 to 4th holding register. Decrement K counter=K00. Reset FFZ flip-flop to binary 0 state. |
| Q03 | J00, K00 | $\overline{FFY \cdot FFZ}$ | Generate a QACT signal. |
| Q03 | J00, K00 | QACT | Add 4 to A register. |
| Q03 | J00, K00 | $P_6$·WRY | Increment Q counter=Q04. Parallel transfer of holding register output signals to shift registers. Preset J and K counters=J02 and K02. Set FFY and FFZ flip-flops to binary 1 state. Generate and apply QINT signal to memory controller. |

TABLE II.—Continued

| Q Counter State | J and K Counter States | Control Signals | Action |
|---|---|---|---|
| Q04 | J02, K02 | WRY | Transfer A register output signals to address lines 0–17. Generate and apply RRS, DP (10001) signals to command lines for transmittal to memory controller. |
| Q04 | J02, K02 | QPIN | Generate and apply a QINT signal to memory controller. |
| Q04 | J02, K02 | QDA | Transfer signals on N bus lines 0–36 to 1st holding register decrement J counter=J01. |
| Q04 | J01, J02K | WRY | Apply a binary "1" to address line 16. |
| Q04 | J01, K02 | QDA | Transfer signals on N bus lines 0–36 to 2nd holding register decrement J counter=J00. Reset FFY flip-flop to binary 0 state. |
| Q04 | J00, K02 | QDA | Transfer signals on N bus lines 0–36 to 3rd holding register decrement K counter=K01. |
| Q04 | J00, K01 | QDA | Transfer signals on N bus lines 0–36 to 4th holding register decrement K counter=K00. Reset FFZ flip-flop to binary 0 tate. |
| Q04 | J00, K00 | $\overline{FFY \cdot FFZ}$ | Generate a QACT signal. |
| Q04 | J00, K00 | QACT | Add 4 to A register. |
| Q04 | J00, K00 | $P_5 \cdot WRY$ | Parallel transfer of holding register output signals to shift reristers. Preset J and K counters =J02 and K02. Set FFY and FFZ flip-flops to binary 1 state. Generate and apply QINT signal to memory controller. |
| Perform sequentially the actions of Q04 J02, K02 WRY through Q04 J00, K00 $P_5 \cdot WRY$ repeatedly for 12 times and the actions of Q04 J02, K02 WRY through Q04 J00, K00 QACT for a 13th time. | | | |
| Q04 | J00, K00 | $P_6 \cdot DAD$ | Increment Q counter=Q05. |
| Q05 | J00, K00 | $P_0 \cdot WRY$ | Preset Q counter=Q00. Reset write flip-flop to binary 0 state. Preset J counter =J05. Generate and apply a QINT signal to memory controllers |
| Q00 | J05, K00 | | Go to retrieve data control word cycle. |

The WRY, J03 and QDA signals are also applied to address count control matrix 158, FIG. 6, to generate signals for setting flip-flops FFY 160 and FFZ 162 to their binary 1 states. The J03, WRY and QDA signal in a similar manner are applied to interrupt control matrix 110 of FIG. 6 to generate a QINT pulse for applying on line 82 through control bus 85 to memory controller 30 to request a main memory access. The combined J03, QDA and WRY signals enable main control matrix 112 to provide a signal for presetting the J and K counters to their respective J02 and K02 states. With the J and K counters respectively preset to states J02 and K02, K and J decoder 118 provides binary 1 output signals designated at K21 and J21 which are applied to encoder 122. In response to the J21 or K21 signals and a WRY signal, encoder 122 generates five signals which are applied to lines 80 to provide a binary coded signal combination of 10001 representing a RRS, DP command to memory controlled 30. J21 and K21 signals are also applied by means of lines 120 to enable OR-gate 173, FIG. 5, to provide a binary 1 signal for enabling gates 174 during the presence of a J21 or K21 binary 1 signal. Enabled gates 174 provide for transferring signals from A register 144 representing the main memory address to address lines 76 through control bus 85 to memory controller 30.

With reference to the waveforms illustrated in FIG. 7 for a RRS, DP command, it is seen that following the transmittal of the QINT signal a cycle started signal designated as $TS is generated internally to the memory controller. After memory controller 30 has utilized the command and address signal to initiate a storage operation by one of memories 22 or 23, a QPIN signal is transmitted to extended memory controller 18. The J02, K02 and QPIN signals are applied to interrupt control matrix 110 to generate a QINT signal for applying by means of line 82 through control bus 85 to memory controller 30 for requesting a second successive double precision memory cycle. When the memory controller has retrieved from one of memories 22 or 23, two words corresponding to the first two data words to be transferred and written in extended memory 36, a QDA signal is applied by means of line 78 to the extended memory controller 18. The QDA signal signifies that signals representing the first data word retrived have been applied to N bus 74 lines 0–35 for transfer into a first register of holding registers 174. With J02, WRY and QDA signals applied to transfer control matrix 156, a QNCO signal is applied by means of lines 186 to data input gates 40. The QNCO signal applied to data input gates 40 enables a set of 36 gates to provide for transferring signals representings a 36 bit data word from N bus 74 to the first holding register of holding registers 174. The WRY, J02 and QDA signals are also applied to main control matrix 112 which generates a signal for decrementing the J counter to a J01 state. A J01 binary 1 signal is provided from the output of K and J decoder 118 along with a K21 binary 1 signal for applying to gate 182. FIG. 5, to enable gate 182 to provide a binary 1 output signal on address line $A_{22}$ to increment the address by a count of 2 for utilization by the memory controller during the second double precision memory cycle.

Memory controller 30 automatically provides a second QDA signal to extended memory controller 18 on line 90 of control bus 85, when signals representing the second word are present on N bus 74 lines 0–35. The J01 signal from the output of the J and K decoder 118 and WRY signal are applied to data transfer control matrix 156 with the QDA signal received by means of line 90. Data transfer control matrix 156 generates a QNC5 signal which is applied by means of lines 186 to data input gates 40. A set of gates within data input gates 40 respond to the QNC5 signal to transfer signals, corresponding to the second 36 bit data word, from N bus 74 to a second of holding registers 174. The J01 and QDA signal are also applied to main control matrix 112 which generates a signal for decrementing J counter 114 to a state of J00. The J01 and QDA signals are applied to address count control matrix 158 to reset flip-flop FFY 160 to its binary 0 state. As previously described, the J02 and QPIN signals enable interrupt control matrix 110 to provide a QINT signal to memory controller 30 for requesting a second memory cycle. Memory controller 30 automatically responds to the second QINT signal to grant a second successive RRS,DP memory cycle utilizing command signals from encoder 122 applied to cable 80 and the address signals provided on address lines 76 of control bus 85.

Following decrementing the J counter to its J00 state and with the K counter in a K02 state, a QDA signal is received by means of line 90 through control bus 85 from memory controller 30. The QPA signal signifies that signals representing the third 36 bit word retrieved from main memory are now present on lines 0–35 of N bus 74. The K02 and J00 signals corresponding to K and J counter states of K02 and J00 are applied in conjunction with the QDA signal to data transfer control matrix 156 which provides a QPDO signal on lines 186 applied to data input gates 40. The QPDO signal enables a set of 36 gates within data input gates 40 to transfer signals representing the third 36 bit word from N bus 74 to a third one of holding resistors 174. K02 and J00 signals in conjunction with the QDA signal are also applied to main memory controller matrix 112 for decrementing K counter 115 to a state of K01. With a K counter state of K01 and J counter state of J00, the next QDA pulse received from the memory controller signifies that signals representing the fourth 36 bit word retrieved from main memory are present on lines of N bus 74. The K01 and QDA signals are applied to data transfer control matrix 156 for generating a QPD5 signal on lines 185 to data input gates 40. The QPD5 signal enables a set of 36 gates within data input gates 40 to provide for transfer of the signals representing the fourth 36 bit word from N bus 74 to the fourth of holding registers 174. The K01 and QDA signals are also applied to main control matrix 112 for decrementing the K counter equal to a K00 state and are in a similar manner applied to address count control matrix 158 for resetting flip-flop FFZ 162 to its binary 0 state. With flip-flops FFY 160 and FFZ 162 both in their binary 0 states, their binary 0 output signals are applied to AND-gate 184 which provides a QACT signal. The resulting QACT signal is applied to the A register flip-flop corresponding to the address bit represented by the signal applied to line A21 for incrementing the data address contained in A register 144 by a count of 1, which automatically increases the representative address signals present on address lines 76 by a count of 4.

Synchronization control 48 has been initialized for operation previously during the data control word retrieval operation by presetting the Q counter to a state of Q00. With a Q counter state of Q00 and J counter state of J00 and K counter state of K00 states, the next sector signal appearing on waveform DRS illustrated in FIG. 8 provides a signal for incrementing the Q counter to a state of Q01. The sector signal also enables a time pulse distributor (not shown) within extended memory control 48 to provide nine timing signals $P_0$–$P_8$ in synchronism with the QCLM signal from extended memory to logic throughout extended memory controller 18. With the Q counter state of Q01, the sector address provided by the binary address signals illustrated by the DRA waveform in FIG. 8 are compared with the sector address from the S register. At Q counter state of Q01 and the time of occurrence of the $P_8$ timing signal, address comparison is checked in a suitable manner well-known in the art to determine if address comparison is achieved. If the addresses are equal, the Q counter is incremented to a state of Q02. If the addresses are not equal, the Q counter is preset to a state of Q00 and another comparison made following the next sector mark signal. With a WRY signal present, the Q counter at Q02 state, and the time pulse distributor providing an output signal $P_6$, the Q counter is incremented to a state of Q03. The WRY, Q02 and $P_6$ signals are also applied to the data transfer control matrix 156 which generates a signal designated at QCET as illustrated in FIG. 3. The QCET signal is applied to a set of 144 gates within transfer gates 172 to provide for parallel transfer of signals representing the four 36 bit words in holding registers 174 to shift registers 64. The signals Q02 and $P_6$ are applied in a similar manner to main control matrix 112 to generate signals for presetting the K and J counters to states of K02 and J02 respectively. Signals Q02, $P_6$ and WRY are applied to gate 188 to set write flip-flop 190 to its binary 1 state. The Q02, WRY and $P_6$ signals are also applied to address count control matrix 158 which provides signals to set flip-flops FFY 160 and FFZ 162, as illustrated in FIG. 6, to their binary 1 states. The Q02, $P_6$ and WRY signals are in a similar manner applied to interrupt control matrix 110 to generate a QINT signal which is applied by means of line 82 through control bus 85 to memory controller 30.

Synchronization control 48 provides a Q34 binary 1 output signal when the Q counter is in the Q03 or Q04 states. The Q34 signal and each successive binary 1 signal appearing on the QCLM waveform illustrated in FIG. 8 are applied to inputs of AND-gate 170 illustrated in FIG. 5 to provide binary 1 output signals corresponding to each binary 1 signal of the QCLM waveform for a write operation. The binary 1 output signals are shift signals provided during Q counter states of Q03, Q04 and P signal times (except during the $P_6$ timing signal time when gate 192 is inhibited). The shift signals are provided during the time interval indicated by line 200 of Table II. During a write operation each binary 1 QCLM clock signal except the signal corresponding to the $P_6$ timing signal is provided as the shift signals previously described at the output of AND-gate 170 and applied by means of line 171, identified as QESR, to each of sixteen 9 bit character shift registers 64 to serially shift each bit in each of the nine bit shift registers to write amplifiers 68.

Write amplifiers 68 are in an enabled state due to the presence of a write enable signal on line 195 resulting from the write flip-flop 190 being set to its binary 1 state, as previously described in response to Q02 and $P_6$ signals. Therefore, bits shifted into the least significant bit position of each of sixteen 9 bit shift registers 64 are written serially in a corresponding one of 16 tracks. The write operation continues in accordance with the sequence of operations illustrated in Table II.

The Q counter states of Q03 and Q04 in conjunction with the $P_6$ timing signal provide control of both memory controller 30 and extended memory 36 until the end sector-end write (DAD) signal is received by means of the DRA signal. The end sector-end write (DAD) signal represents the completion time for writing data into extended memory 36. Upon receiving a $P_6$ timing signal coinciding with the time of occurrence of the end sector-end write (DAD) signal, the Q counter is incremented to a state of Q05. During the Q05 state the WRY, Q05 and $P_0$ signals applied to gate 194 as illustrated in FIG. 5 reset write flip-flop 190 to its binary 0 state thereby providing a binary 0 signal on output line 195 to disable write amplifiers 68 from further writing.

The write data waveform of FIG. 8 illustrates that data is written into extended memory during the time between $P_0$ time of the Q counter Q02 state and $P_6$ time of the Q counter Q04 state coinciding with the end sector signal. The Q counter state of Q05 provides for writing three parity bits in a manner which is not material to this invention. The Q05 signal resulting from a Q counter state of TQ05 and $P_0$ timing signals are also applied to main control matrix 112 which provides a signal for presetting the J counter to a state of J05 for initiating a retrieve data control word cycle of operation as previously described.

Data control word pairs are retrieved from main memory as long as a representation of the address of the next DCW is provided by a previous DCW or until a DCW or PCW specifying a "disconnect" is received. A DCW providing a function code comprised of an all 0 binary signal configuration which is entered into F register 152 is decoded by F decoder 154 to provide the DIS signal, FIG. 5. The DIS signal is applied to main control matrix 112 to generate a signal for presetting the J counter to the J00 state which is termed the rest state.

The total addressable main memory of the storage system of FIG. 3 comprises the main memory capacity of memories 22 and 23 combined. Memory 22 could in a specific example, contain a DCW pair which is retrieved by extended memory controller 18 and utilized by controller 18 to control an information transfer function whereby information is transferred between memory 23 and extended memory 36. In this example, the next DCW pair may be retrieved from one memory such as memory 22 and utilized to control a second memory such as memory 23 and also extended memory 36. In the illustrative embodiment memory controller 30 automatically provides addressing for a main memory comprised of the combined locations of memories 22 and 23 by having the highest numbered address of a location in memory 22 continue consecutively to the lowest numbered address of a location of memory 23 such that memories 22 and 23 appear as one memory comprised of locations with consecutive addresses.

If the DCW pair specifies a disconnect operation, the DIS signal provided at the output of decoder 154 is applied to main control matrix 112. Matrix 112 responds to the DIS signal by providing an output signal which presets J counter 114 to the J00 rest state thereby terminating further retrieval of DCW pairs. Following a DCW initiated disconnect, it is necessary for a computer of the system to execute a connect instruction to provide a PCW specifying a "start," retrieve data control word pair operation before an information transfer can be controlled by extended memory controller 18.

Figure 2:
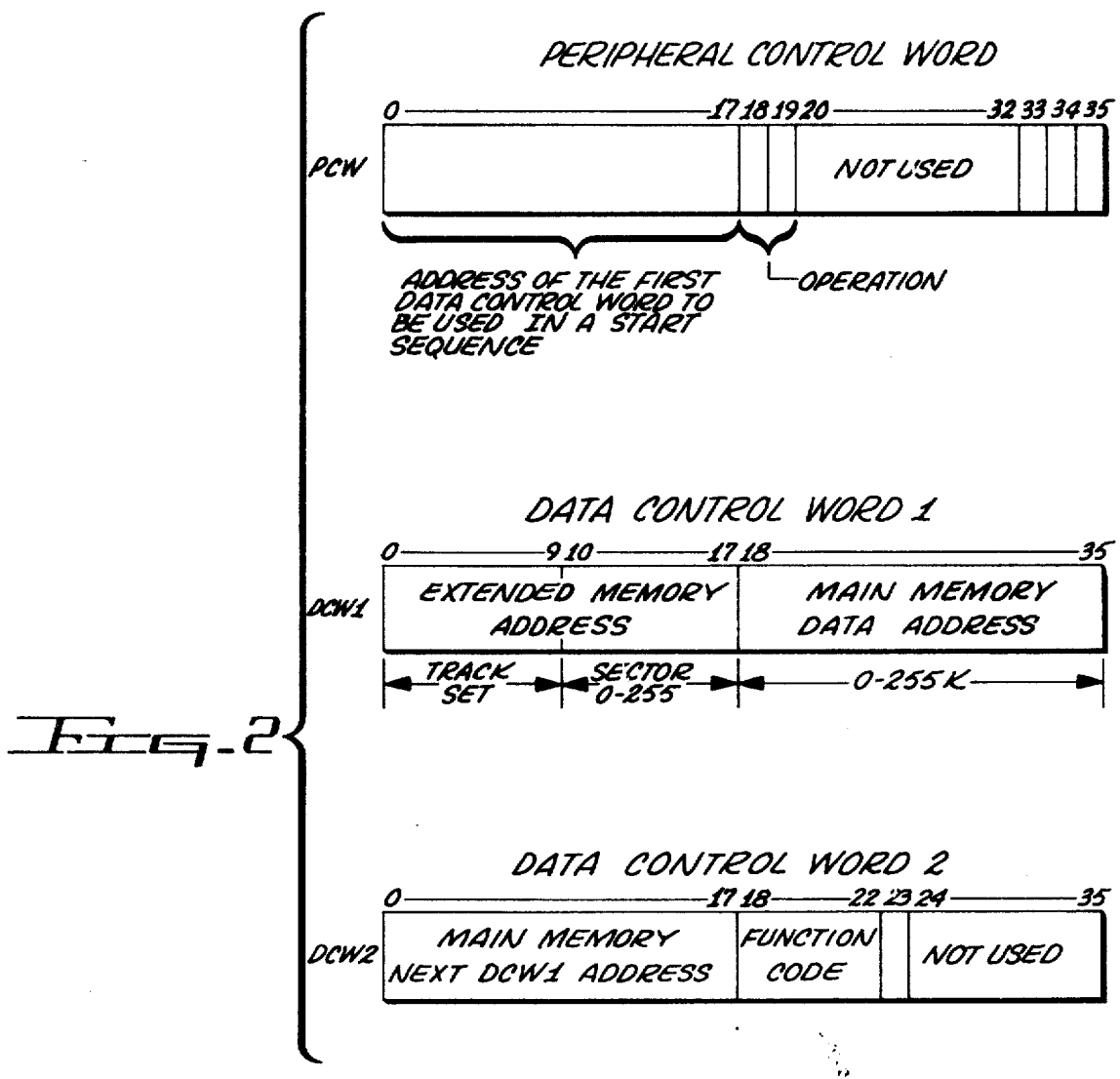
FIG. 2 is a symbolic diagram of the contents of the various control words employed in the system of FIG. 1.

If the peripheral control word bits 18 and 19 are both binary 0's, FIG. 2, a "disconnect" operation is specified. The PCW initiated disconnect is termed an emergency disconnect since the PCW specifying a "disconnect" may be accepted at any time during an extended memory controller busy condition, such as while controlling the execution of an operation specified by a DCW pair. The PCW disconnect operation may be initiated by a computer executing a connect instruction. The memory controller responds to the connect instruction execution by retrieving a PCW specifying a "disconnect" operation from a designated main memory address and supplies the signals representing the bits of the PCW on lines 0–35 of N bus 74 to the extended memory controller 18. Signals corresponding to bits 18 and 19 of the PCW which are present on N bus 74 are applied on 2 lines designated as N 18, 19, FIG. 3, in conjunction with a QCNI pulse, generated by the memory controller in response to execution of the connect instruction and applied on line 88, directly to PCW decoder 42. PCW decoder 42 responds to the QCNI signal and binary 0 signals provided by bits 18 and 19 to generate a binary 1 signal designated as G46 which is applied to F register 152, FIG. 5. The G46 signal is also applied to main control matrix 112 as illustrated in FIG. 6. The G46 signal applied to F register 152 provides for resetting all of the F register flip-flops to their binary 0 state while the G46 signal applied to main control matrix 112 provides for a signal to reset J counter 114 to the J00 rest state. Thus with a PCW initiated disconnect the F register flip-flops are all reset to their binary 0 state and the J counter is preset to a J00 state terminating any operation which may be in process. Following a PCW initiated disconnect, it is necessary for a computer of the system to execute a connect instruction to provide a PCW specifying a "start," retrieve data control word pair operation before an information transfer again can be controlled by extended memory controller 18.

While the principles of the invention have been made clear in an illustrative embodiment there will be immediately obvious to those skilled in the art many modifications in structure, arrangement, proportions, the elements, materials and components used in the practice of the invention and otherwise which are particularly adapted for specific environments and operating requirements without departing from those principles. The appended claims are therefore intended to cover and embrace any such modifications within the limits only of the true spirit and scope of the invention.

What is claimed is:

1. A storage control system comprising: a random access storage member having a plurality of addressable locations therein, each of a plurality of said locations containing a respective one of a succession of linked control words, each one of said control words including a link address and a function code, said link address representing the location storing the control word in said succession next following said one control words, said function code representing one of a plurality of different types of transfer operations, all of the function codes of the control words in said succession representing a plurality of different types of transfer operations; a storage controller for controlling the execution of a succession of different types of storage operations, means for coupling said controller to said storage member; means for transferring a first of said control words to said storage controller; said storage controller including first means being responsive to the function code in said first control word for transmitting a control signal representing the type of transfer operation corresponding to said function code; a storage means; means for coupling said storage means to said controller; said storage means including first means to receive said control signal and being responsive to said control signal to execute the type of storage operation for effecting the transfer operation represented by said control signal; said controller including second means being responsive to the link address in said first control word for transmitting a signal set representing said link address; said storage member including means being responsive to said signal set for retrieving and transmitting to said storage controller the control word stored in the location represented by said signal set.

2. The storage control system of claim 1 wherein: said storage means comprises a plurality of addressable storage locations therein; each of said control words further includes a data address, each one of said data addresses representing a respective one of said locations in said storage means; said storage controller including third means being responsive to the data address in each of said control words for transmitting a data address signal set representing a respective one of said locations in said storage means; said storage means including second means to receive said data address signal set from said controller and being further responsive to said data address signal set to execute said type of storage operation at the location represented by said data address signal set.

3. A storage control system comprising: a random access storage member having a plurality of addressable locations therein, each of a plurality of said locations containing a respective one of a succession of linked control words, each one of said control words including a link address and a function code, said link address representing the location storing the control word in said succession next following said one control word, said function code representing one of a plurality of different types of transfer operations, all of the function codes of the control words in said succession representing a plurality of different types of transfer operations; a storage controller for controlling the execution of a succession of different types of storage operations, means for coupling said controller to said storage member; means for transferring a first of said control words to said storage controller; said storage controller including first means being responsive to the function code in said first control word for transmitting a control signal representing the type of transfer operation corresponding to said function code; said storage member including first means to receive said control signal and being responsive to said control signal to execute the type of storage operation for effecting the transfer operation represented by said control signal; said controller including second means being responsive to the link address in said first control word for transmitting a signal set representing said link address; said storage member including second means being responsive to said signal set for retrieving and transmitting to said storage controller the control word stored in the location represented by said signal set.

4. The storage control system of claim 3 wherein: said storage member further has a plurality of said locations containing a respective one of a plurality of data word; each of said control words further includes a data address, each of said data addresses representing a respective one of said locations in said storage member containing a respective one of said plurality of data words, said storage controller including third means being responsive to said data address in each of said control words for transmitting a data address signal set representing a respective one of said locations containing a respective one of a plurality of data words in said storage member, said storage member including third means to receive said data address signal set and being further responsive to said data address signal set to execute said type of storage operation at the location represented by said data address signal set.

5. A storage control system comprising: a first storage means having a plurality of addressable locations therein, each of a plurality of said locations containing a respective one of a succession of linked control words, each one of said control words including a link address and a function code, said link address representing the location storing the control word in said succession next following said one control word, said function code representing one of a plurality of different types of transfer operations, all of the function codes of the control words in said succession representing a plurality of different types of transfer operations; a storage controller for controlling the execution of a succession of different types of storage operations, means for coupling said controller to said storage member; means for transferring a first of said control words to said storage controller; said storage controller including first means being responsive to the function code in said first control word for transmitting a control signal representing the type of transfer operation corresponding to said function code; a second storage means; means for coupling said second storage means to said controller; said second storage means including first means to receive said control signal and being responsive to said control signal to execute the type of storage operation for effecting the transfer operation represented by said control signal; a signal source means for transmitting a termination signal to said controller representing the time of completion of said storage operation; means for coupling said controller to said signal source means; said controller including second means to receive said termination signal and being responsive to said termination signal to transmit a signal set representing said link address; said first storage means being responsive to said signal set including means for retrieving and transmitting to said storage controller the control word stored in the location represented by said signal set.

6. A data handling system comprising: a storage means having a plurality of addressable storage locations therein, each of a plurality of said locations being adapted to store data words; a random access storage member having a plurality of addressable locations therein, each of a plurality of said locations containing a respective one of a succession of linked control words, each one of said control words including a data address, a link address, and a function code, said data address representing one of said locations in said storage means, said link address representing the location storing the control word in said succession next following said one control word, said function code representing one of a plurality of different types of transfer operations all of the function codes of the control words in said succession representing a plurality of different types of transfer operations; a storage controller for controlling the execution of a succession of different types of storage operations, means for coupling said controller to said storage means and said storage member; means for transferring a first of said control words to said storage controller; a data word supply means for transmitting data words to said storage means; said storage controller including first means being responsive to the data address in said first control word for transmitting a data address signal set representing a location in sadi storage means and being responsive to the function code in said first control word for transmitting at least one of respective control signals to each of said storage means and storage member and said data word supply means representing the type of transfer operation corresponding to said function code; said storage means including first means being responsive to said respective control signals received to execute one of a plurality of types of storage operations for effecting the transfer operation represented by said respective control signals, one of said different types of storage operations being a storing operation; means for coupling said data word supply means to said controller; said data word supply means including means to receive said respective control signals and being responsive to the control signals received therefrom for transmitting data words; means for coupling said storage means to said data word supply means; said storage means including second means being responsive to the control signals received and said data address signal set for receiving and storing data words in the location represented by said data address signal set; said controller including second means being responsive to the link address in said first control word for transmitting to said storage member a link address signal set representing said link address; said storage member including means being responsive to said link address signal set for retrieving and transmitting to said storage controller the control word stored in the location represented by said link address signal set.

7. A data handling system comprising: a storage means having a plurality of addressable locations therein, each of a plurality of said locations being adapted to store data words; a random access storage member having a plurality of addressable locations therein, each of a plurality of addressable locations therein, each of a plurality of said locations containing a respective one of data words and each of a plurality of said locations containing a respective one of a succession of linked control words, each one of said control words including a first and a second data address, a link address and a function code, said first data address representing one of said locations in said storage means, said second data address representing one of said locations storing a data word in said storage member, said link address representing the location storing the control word in said succession next following said one control word, said function code representing one of a plurality of different types of transfer operations, all of the function codes of the control words in said succession representing a plurality of different types of transfer operations; a storage controller for controlling the execution of a succession of different types of storage operations, means for coupling said controller to said storage means and said storage member; a data transfer means for receiving and transmitting data words, means for coupling said data transfer means to said storage means and said storage member; means for transferring a first of said control words to said storage controller; said storage controller including first means being responsive to said first data address in said first control word for transmitting a first data address signal set representing a location in said storage means including second means, being responsive to said second data address in said first control word for transmitting a second data address signal set representing a location in said storage member, and including third means being responsive to the function code in said first control word for transmitting at least one of respective control signals to each of said storage means, said storage member and said data transfer means representing the type of transfer operation corresponding to said function code; means for coupling said data transfer means to said controller; said data transfer means including means to receive said respective control signals and being responsive to the control signals received for receiving data words from said storage member and transmitting data words to said storage means; said storage means including first means being responsive to the respective control signals received to execute one of a plurality of types of storage operations for effecting the transfer operation corresponding to said function code, one of said types of storage operations being a storing operation, said storage means including second means being responsive to the control signals received and said first data address signal set for receiving and storing data words in the location addressed by said first data address signal set; said storage member including first means being responsive to the respective control signals received to execute one of a plurality of types of storage operations for effecting the transfer operation corresponding to said function code, one of said types of storage operations being retrieving operation, said storage member including second means being responsive to the control signals received and said second data address signal set for retrieving and transmitting to said data transfer means the data words stored in the location represented by said second data address signal set; said controller including fourth means being responsive to the link address in said first control word to transmit a link address signal set representing said link address; said storage member including third means being responsive to said link address signal set for retrieving and transmitting to said storage controller the control word stored in the location addressed by said link address signal set.

8. A data storage control system comprising: a plurality of random access storage members, each having a plurality of addressable locations therein, each of a plurality of said locations in at least one of said storage members being adapted to store a data word, each of a plurality of said locations in at least one of said storage members containing a respective one of a succession of linked control words, each one of said control words including a link address and a function code, said link address representing the location storing the control word in said succession next following said one control word, said function code representing one of a plurality of different types of transfer operations, all of the function codes of the control words in said succession representing a plurality of different types of transfer operations; a storage controller for controlling the execution of a succession of different types of storage operations, means for coupling said controller to each of said storage members; means for transferring a first of said control words to said storage controller; said storage controller including first means being responsive to the function code in said first control word for transmitting control signals representing the type of transfer operation corresponding to said function code; a storage means; means for coupling said storage means to said controller; said storage means including first means to receive at least one of said control signals and being responsive to the control signals received therefrom to execute the type of storage operation for effecting the transfer operation represented by the control signals; a first one of said storage members being coupled to said controller including first means to receive at least one of said control signals and being responsive to the control signals received therefrom to execute the type of storage operation for effecting the type of transfer operation represented by said control signals; said controller including second means being responsive to the link address in said first control word for transmitting a signal set representing said link address; a second one of said storage members including means being responsive to said signal set for retrieving and transmitting to said storage controller the control word stored in the location addressed by said signal set.

9. The data storage control system of claim 8 wherein; said storage means comprises a plurality of addressable storage locations therein; each one of said control words further includes a first and a second data address, said first data address representing a respective one of said locations in said storage means and said second data address representing a respective one of said locations in said first storage member; said storage controller including third means being responsive to said first data address for transmitting a first data address signal set representing a respective one of said locations in said storage means and being further responsive to said second data address for transmitting a second data address signal set representing a respective one of said locations in said first storage member; said storage means including second means to receive said first data address signal set and being further responsive to said first data address signal set to execute said type of storage operation at the location represented by said first data address signal set; said first storage including second means to receive said second data address signal set to execute said type of storage operation at the location represented by said second data address signal set.

10. A data storage control system comprising: a random access storage member having a plurality of addressable locations therein, each of a plurality of said locations being adapted to store a respective data word, each of a plurality of said locations containing a respective one of a succession of linked control words, each one of said control words including a link address and a function code, said link address representing the location storing the control word in said succession next following said one control word, said function code representing one of a plurality of different types of transfer operations, all of the function codes of the control words in said succession representing a plurality of different types of transfer operations; a storage controller for controlling the execution of a succession of different types of storage operations, means for coupling said controller to said storage member; means for transferring a first of said control words to said storage controller; said storage controller including first means being responsive to the function code in said first control word for transmitting a control signal and a control signal set, each of said control signal and control signal sets representing the type of transfer operation corresponding to said function code; a storage means; means for coupling said storage means to said controller; said storage means including means to receive said control signal and being responsive to said control signal to execute the type of storage operation for effecting the transfer operation represented by said control signals; said storage member including first means being coupled to said controller to receive said control signal set and being responsive to said control signal set to execute the type of storage operation for effecting the transfer operation represented by said control signal set; said controller including second means being responsive to the link address in said first control word to transmit a link address signal set representing said link address; said storage member including second means being responsive to said link address signal set for retrieving and transmitting to said storage controller the control word stored in the location addressed by said address signal set.

References Cited

UNITED STATES PATENTS

| | | | |
|---|---|---|---|
| 3,171,099 | 2/1965 | Foulkes | 340—172.5 |
| 3,218,611 | 11/1965 | Kilburn et al. | 340—172.5 |
| 3,248,702 | 4/1966 | Kilburn et al. | 340—172.5 |
| 3,413,613 | 11/1968 | Bahrs et al. | 340—172.5 |

RAULFE B. ZACHE, Primary Examiner

PO-1050
(5/69)

UNITED STATES PATENT OFFICE
CERTIFICATE OF CORRECTION

Patent No. 3,525,080                  Dated August 18, 1970

Inventor(s) John F. Couleur and Edward L. Glaser

It is certified that error appears in the above-identified patent and that said Letters Patent are hereby corrected as shown below:

In column 1, lines 7 and 8 delete "and General Electric Company, New York, N.Y., a corporation of New York".

In column 2, line 35 change "hereafter" to --hereinafter--.

In column 15, line 4 change "maintain" to --main--.

In column 17, line 61 delete "address numbers, automatically receives the address" and substitute --accessed in memories 20-23 for each memory address--.

In column 19, line 31 delete "and insure sampling of information bits at"; line 32 before DCW insert --In the illustrated embodiment, the S register of--.

In column 22, line 37 delete "by"; line 74 change "Three" to --The--.

In column 24, line 22 change "locaction" to --location--.

In column 27, line 51 change "to" (first occurrence) to --and--.

In column 29, line 12 change "221" to --K21--.

In column 32, line 13 change "102" to --J02--; in line 20 change "QUINT" to --QINT--; in line 57 change "ilnes" to --lines--.

In column 33, line 13 change "J02K" to --K02--; in line 53 change "at" to --as--.

SIGNED AND
SEALED
FEB 2 1971

(SEAL)
Attest:

Edward M. Fletcher, Jr.
Attesting Officer

WILLIAM E. SCHUYLER, JR.
Commissioner of Patents